(12) United States Patent
Yoshida et al.

(10) Patent No.: US 7,128,198 B2
(45) Date of Patent: Oct. 31, 2006

(54) WORKPIECE CONVEYOR FOR PRESS LINE

(75) Inventors: Toshiyuki Yoshida, Komatsu (JP);
Hidetoshi Akashi, Kanazawa (JP);
Kazuhiko Shiroza, Komatsu (JP)

(73) Assignee: Komatsu Ltd., Tokyo (JP)

( * ) Notice: Subject to any disclaimer, the term of this patent is extended or adjusted under 35 U.S.C. 154(b) by 217 days.

(21) Appl. No.: 10/741,521

(22) Filed: Dec. 18, 2003

(65) Prior Publication Data

US 2005/0178641 A1    Aug. 18, 2005

(30) Foreign Application Priority Data

| Dec. 26, 2002 | (JP) | ............................. 2002-377894 |
| Dec. 26, 2002 | (JP) | ............................. 2002-377895 |
| Nov. 12, 2003 | (JP) | ............................. 2003-382660 |
| Nov. 27, 2003 | (JP) | ............................. 2003-396995 |

(51) Int. Cl.
*B65G 47/34* (2006.01)

(52) U.S. Cl. ................. 198/468.4; 198/468.6

(58) Field of Classification Search ........... 198/468.01, 198/468.4, 468.6, 750.12
See application file for complete search history.

(56) References Cited

U.S. PATENT DOCUMENTS 4,530,637 A * 7/1985 Mason et al. ............ 198/468.4
4,688,668 A * 8/1987 Ookubo et al. .......... 198/468.6
5,072,823 A * 12/1991 Takahashi et al. ....... 198/468.4
5,103,965 A * 4/1992 Takahashi et al. ....... 198/468.4
5,257,899 A * 11/1993 Asakura et al. .......... 198/468.4
6,109,423 A * 8/2000 Moriyasu et al. ........ 198/468.4
6,374,994 B1   4/2002 Hofele et al.
6,374,995 B1   4/2002 Hofele et al.

FOREIGN PATENT DOCUMENTS

| DE | 198 51 743 A1 | 5/2000 |
| JP | 59-49436 U | 4/1984 |
| JP | 6-262280 A | 9/1994 |
| JP | 06-320447 A | 11/1994 |
| JP | 07-227776 A | 8/1995 |
| JP | 2003-200231 A | 7/2003 |

* cited by examiner

*Primary Examiner*—James R. Bidwell
(74) *Attorney, Agent, or Firm*—Frishauf, Holtz, Goodman & Chick, P.C.

(57) ABSTRACT

A work piece conveyor whose structure is simplified and downsized with the intention of achieving cost reduction, an improved degree of freedom in setting a motion pattern and improved productive efficiency. The workpiece conveyor is such that a cross bar carrier for supporting a cross bar provided with vacuum cups is movably attached, through a linear movement mechanism, to a feed lever which is oscillating-driven along a workpiece conveying direction, thereby making the relative distance between the center of oscillation of the rocking element and the cross bar variable.

27 Claims, 27 Drawing Sheets

3(a)
3(b)

FIG. 4
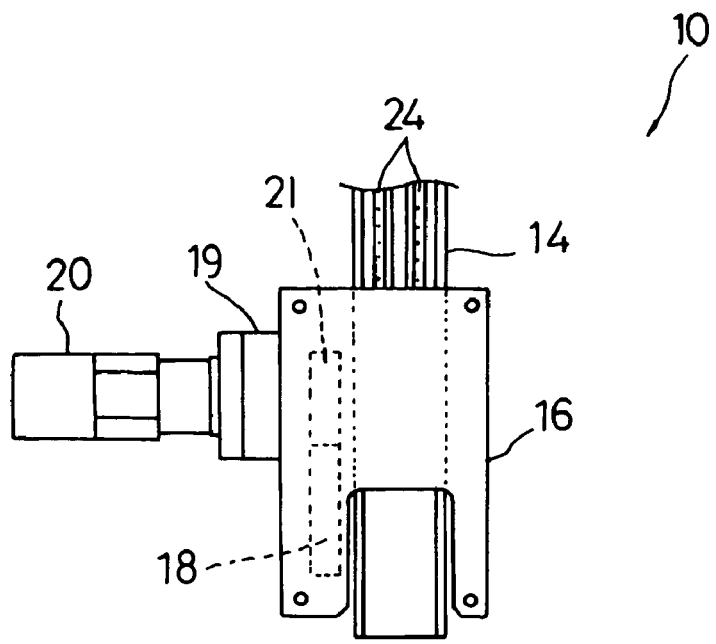
4(a)
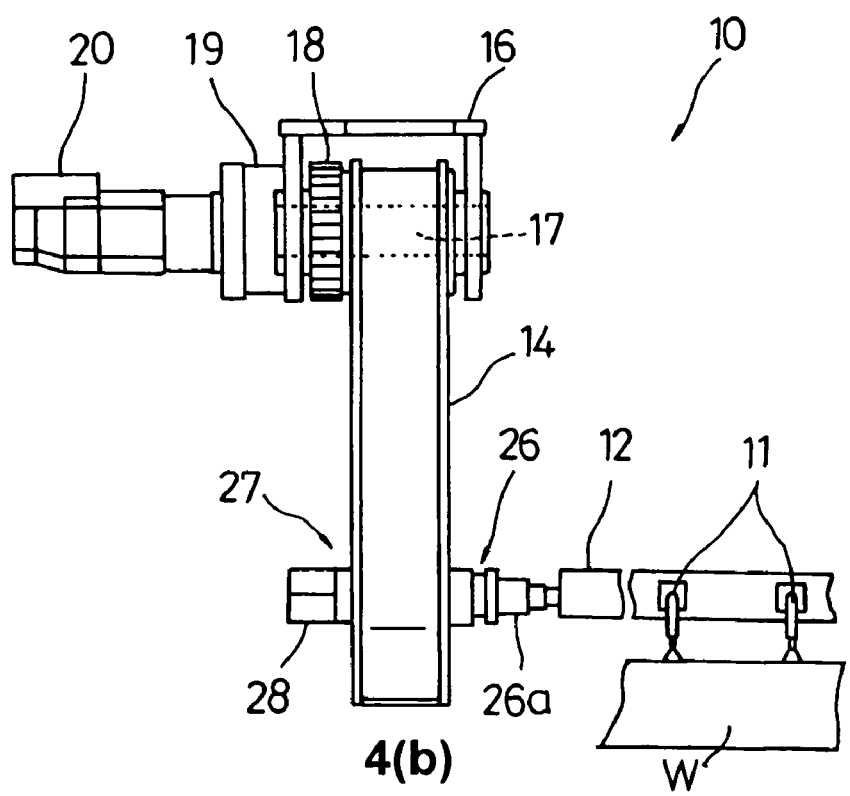
4(b)

FIG. 6
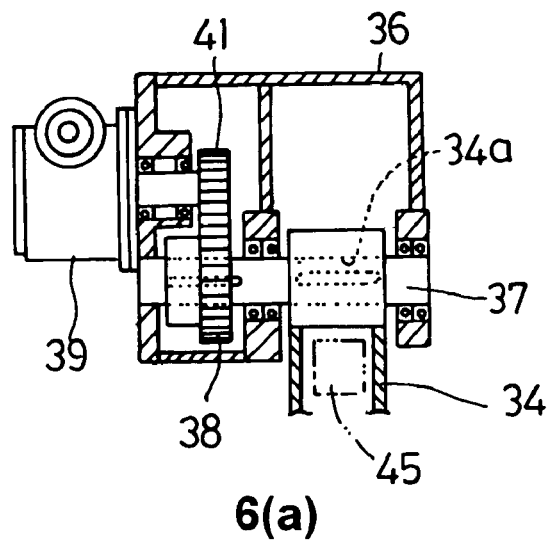
6(a)
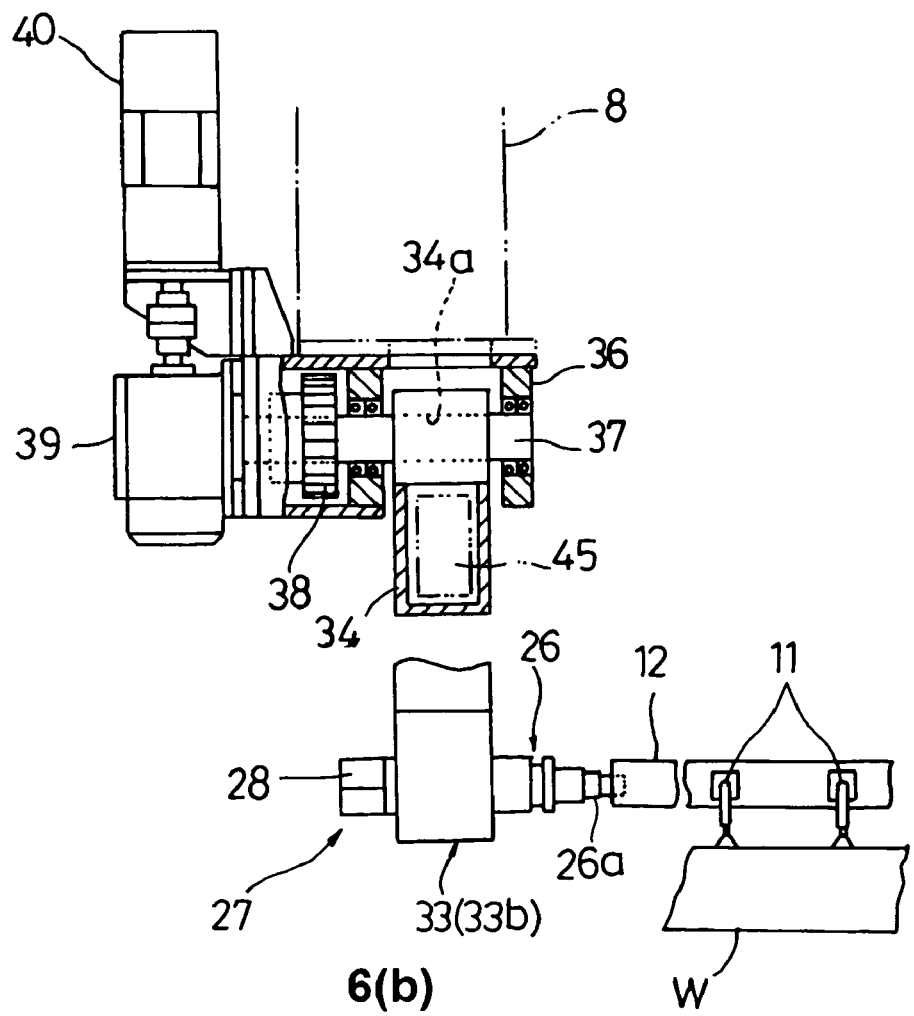
6(b)

FIG. 14
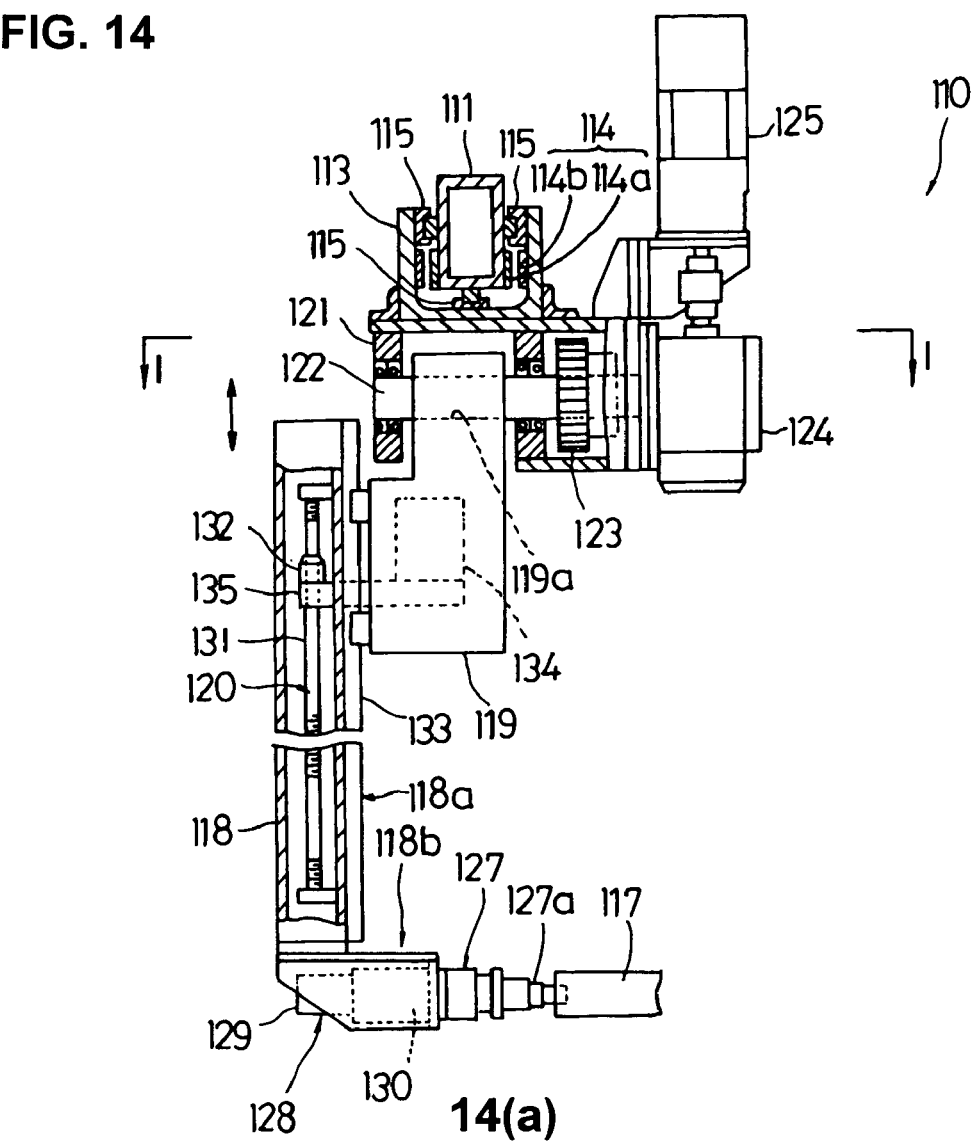
14(a)
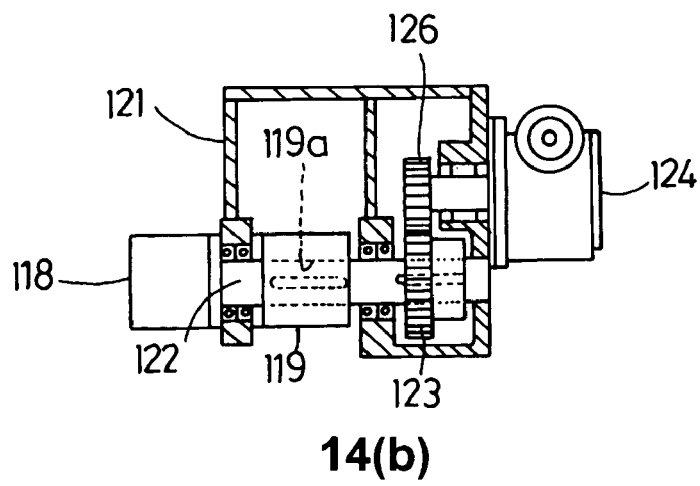
14(b)

FIG. 27
PRIOR ART
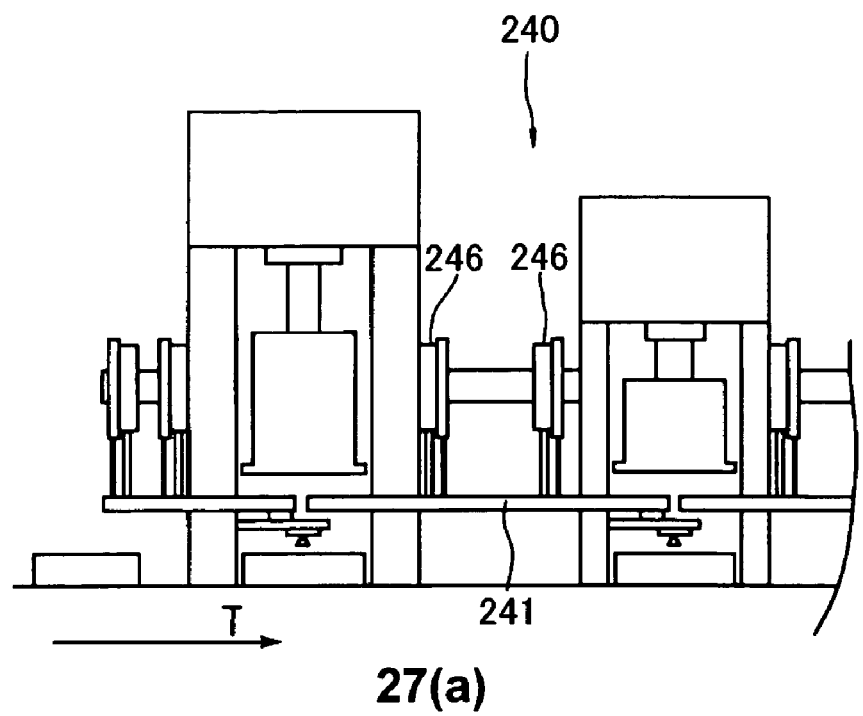
27(a)
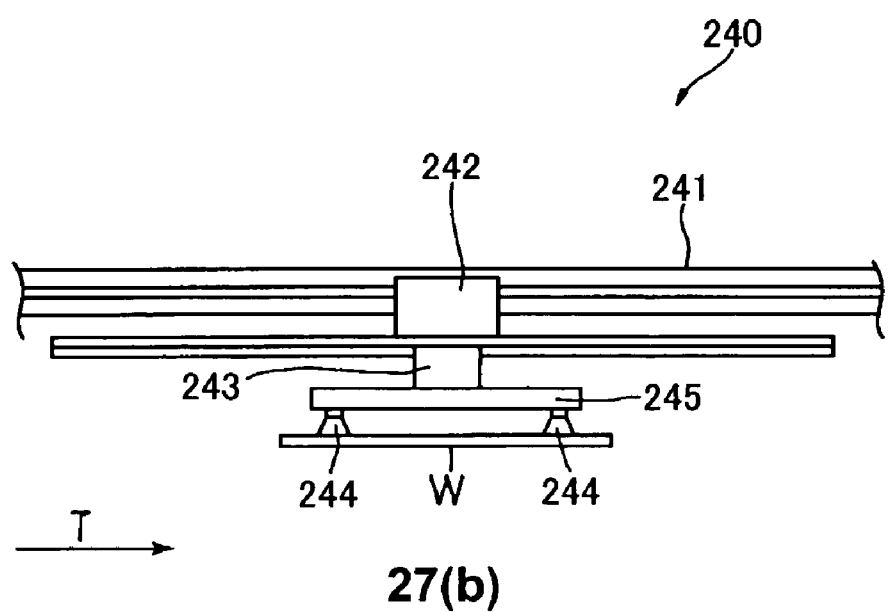
27(b)

WORKPIECE CONVEYOR FOR PRESS LINE

TECHNICAL FIELD

The present invention relates to a workpiece conveyor incorporated in a press line for transferring workpieces into and out of work stations in synchronization with press work.

BACKGROUND ART

Typical press lines such as transfer presses and tandem press lines are provided with workpiece conveyors for transferring workpieces into and out of work stations in synchronization with a series of multiple press work operations.

As such workpiece conveyers, there has been proposed a workpiece conveyor (transfer feeder) for use in a transfer press in Japanese Patent Kokai Publication No. 6-262280 filed by the present applicant. The workpiece conveyor 200 disclosed in this publication comprises, as shown in FIG. 24, a pair of lift beams 201 disposed side by side, extending in a workpiece conveying direction T; a plurality of cross bar carriers 202 aligned at intervals in the workpiece conveying direction T, being movably supported by these lift beams 201; cross bars 203 each extending in a direction perpendicular to the workpiece conveying direction T between an opposed pair of cross bar carriers 202. With vacuum cups (not shown) attached to the cross bars 203, a workpiece (not shown) is held by adsorption and conveyed.

In the workpiece conveyor 200, the lift beams 201 are suspended from above through lift mechanisms each having a servo motor 204 as a driving source. The adjacent cross bar carriers 202 aligned side by side in the workpiece conveying direction T are connected by a coupling rod 205, and the most downstream cross bar carrier 202 is connected to the distal end of a cam lever 207 through a coupling rod 206. A feed cam 208 rotatable by a power extracted from the press body is in contact with the cam lever 207. The feed cam 208 is rotated while the lift beams 201 being vertically moved by activation of the servo motors 204, so that the cam lever 207 is oscillated, thereby reciprocating all the cross bar carriers 202 at the same time in the workpiece conveying direction T. In this way, the movements in the vertical direction and in the workpiece conveying direction T are combined into a synthetic movement to cause the motion of the cross bars 203, which allows the workpiece to be transferred between the dies of the adjacent presses.

Another workpiece conveyor has been proposed in German Patent Application No. 19851743. As shown in FIG. 25, the workpiece conveyor 210 disclosed in this publication is designed such that a pair of uprights 211 are disposed at the right and left when viewed in the workpiece conveying direction T, opposing to each other with a specified spacing, and a cross bar 213 is disposed in the space between the pair of uprights 211, the cross bar 213 having a plurality of vacuum cups 212 for retaining a workpiece (not shown) suspended therefrom during a delivery of the workpiece from an upstream work station to a downstream work station. The workpiece conveyor 210 has, in combination, an oscillation driving unit 214 for rocking the cross bar 213 and an up-and-down driving unit 215 for moving the cross bar 213 up and down.

The oscillation driving unit 214 comprises a pair of arms 216 for supporting both ends of the cross bar 213 being held perpendicularly to the workpiece conveying direction T; carriages 217 each of which is supported by its associated upright 211 so as to be freely movable in a vertical direction and pivotally supports the proximal end of its associated arm 216; carriages 218 each slidably supported by its associated carriage 217; servo motors 219 each attached to its associated carriage 218; and guide rods 220 each of which has a proximal end to which a power transmission shaft 220a is secured and a distal end which is pivotally attached to the substantial center of its associated arm 216, the power transmission shaft 220a being connected to the output shaft of its associated servo motor 219 through a power transmission mechanism composed of bevel gears etc. The oscillation driving unit 214 is designed such that the relative movement of the carriages 217 and 218 allows each guide rod 220 to pivot about the power transmission shaft 220a, being driven by the servo motor 219, and each arm 216 is oscillated around its pivotal point by torque from the guide rod 220.

The up-and-down driving unit 215 is composed of servo motors 221 and screw mechanisms 222. Each screw mechanism 222 is interposed between its associated servo motor 221 and carriage 218, for converting the torque of the servo motor 221 into a linear motion force. In the up-and-down driving unit 215, the carriages 218 are moved up and down by activation of the servo motors 221 to move the entire oscillation driving unit 214 upward and downward. The up-and-down driving unit 215 has air-type balance cylinders 223 for imparting an upward energizing force to the carriages 218.

Changes in the height of the cross bar 213 caused by the oscillation of the arms 216 driven by the servo motors 219 are substantially compensated by the upward/downward movement caused by the servo motors 221, and the cross bar 213 is arbitrarily moved upward and downward in some cases, so that the motion indicated by broken line M in FIG. 25 is made.

The above-cited German Patent Application No. 19851743 has proposed a workpiece conveyor 230 as another embodiment, which comprises, as shown in FIG. 26, a pair of arms 232 pivotally supported by a pair of brackets 231 at their proximal ends, the brackets 231 being fixed to the bed located between two work stations so as to be spaced at a specified distance in a direction perpendicular to the workpiece conveying direction T. Pivotally attached to the distal ends of the pair of arms 232 is the cross bar 213 which is laterally held so as to extend in a direction perpendicular to the workpiece conveying direction T. In the workpiece conveyor 230 of this embodiment, each of the pair of arms 232 is oscillated around its pivotal point located at the proximal end thereof by activation of an oscillation driving unit 233 attached to each bracket 231. Each arm 232 is of a nested-structure and designed to be expanded and contracted in a longitudinal direction by an expansion/contraction driving unit (not shown) housed in the arm 232. The workpiece conveyor 230 includes a horizontal condition keeping system (not shown) for keeping a workpiece (not shown) in a horizontal condition, and this horizontal condition keeping system has first toothed pulleys secured to the cross bar 213; second toothed pulleys mounted at the proximal ends of the arms 232; and a toothed belt wound around each pair of first and second toothed pulleys. By unrotatably fixing the second toothed pulleys, the workpiece can be maintained in a horizontal condition even when the pair of arms 232 oscillate.

Changes in the height of the cross bar 213 caused by the oscillation of the arms 232 driven by the oscillation driving unit 233 are substantially compensated by proper expansion/contraction of the arms 232 and the cross bar 213 is arbitrarily moved upward and downward in some cases, whereby a motion similar to the motion M (See FIG. 25) of the workpiece conveyor 210 described earlier can be obtained.

The robot type and the loader/unloader type have been known as workpiece conveyors for use in a tandem press line. In the robot type workpiece conveyors, an articulated handling robot is placed between every adjacent pair of press machines, and a workpiece is carried out of a preceding press work station and carried into a succeeding press work station, using the handling robots. The robot type workpiece conveyors have the advantage of setting the trajectory of carrying-out and carrying-in of a workpiece in conformity to the dies. In contrast with this, the loader/unloader type workpiece conveyors are designed such that a loader and unloader of a link structure are provided for the upstream side face and downstream side face, respectively, of each press machine and a shuttle carriage is provided between the upstream unloader and the downstream loader. Carrying-out and carrying-in of a workpiece with respect to the press machine body are done by the unloader and the loader respectively and the delivery of the workpiece to the next station is done by the shuttle carriage.

Regarding the above-described conventional workpiece conveyors for a transfer press, the workpiece conveyor 200 disclosed in Japanese Patent Kokai Publication No. 6-262280 is designed to drive all the cross bar carriers 202 at the same time by the driving means composed of the cam mechanism and link mechanism and therefore the driving system becomes heavy, thick, long, bulky and complex, resulting in poor visibility. In addition, the rigidity of the lift beams 201 needs to be increased in order to ensure positioning accuracy, which unavoidably leads to an increase in the weight of the lift beams 201. For the upward and downward movement of the cross bars 202, it is necessary to entirely move the lift beams 201 up and down, so that large-sized servo motors are needed as the servo motors 204 and, in consequence, the cost as well as the size of the whole system is inevitably increased. Further, since the motions of the cross bars 203 with respect to the workpiece conveying direction T at all the work stations are dependent on the feed cam 208, restrains are placed on setting of the optimum motion pattern for each work station, accompanied with a drop in the degree of freedom.

The workpiece conveyor 210 of German Patent Application No. 19851743 has revealed such a problem that the oscillation driving unit 214 and its peripherals are complex in structure. Additionally, the workpiece conveyor 210 cannot be installed in places where the uprights 211 are not provided and therefore its installation place is limited. Although the size of the servo motors 221 is reduced by the provision of the balance cylinder 223, complicated construction is unavoidably involved.

In the workpiece conveyor 230 according to the second embodiment of German Patent Application No. 19851743, although the cross bar 213 is attached to the distal ends of the pair of expandable/contractible arms 232 that are driven to oscillate along the workpiece conveying direction T and the relative distance between the cross bar 213 and each arm 232 is varied by the expansion and contraction of the pair of arms 232, the minimum length (the length when the arms 232 are fully contracted) of the arms 232 that is inevitably dependent of their structure is relatively long because of the nested-structure of the arms 232, which leads to the problem that the zone within which the cross bar 213 can move is comparatively narrow. According to German Patent Application No. 19851743, the horizontal condition keeping system has the first toothed pulleys secured to the cross bar 213; the second toothed pulleys mounted on the proximal ends of the arms 232; and a toothed belt wound around each pair of first and second toothed pulleys, and even when the pair of arms 232 oscillate, the workpiece can be kept in a horizontal condition, thanks to the second toothed pulleys secured so as to be unrotatable. However, the structure, in which a toothed belt is wound around each pair of first and second toothed pulleys, has presented such a doubt that the pair of arms cannot be expanded and when the pair of arms are contracted, the toothed belt is slackened with the result that the system cannot function properly. No technique for clearing up such a doubt is described in German Patent Application No. 19851743.

Regarding the workpiece conveyors used in a tandem press line, the robot type workpiece conveyors present the problem that if adjacent press machines are apart a long distance, the arm length between the joints needs to be increased in proportion to the distance between the adjacent press machines and therefore the driving unit for each joint is required to have higher output power, which progressively increases the whole size of the workpiece conveyor. On the other hand, if the distance between the adjacent press machines is short, it becomes very difficult to set a workpiece trajectory so as to avoid interference between the workpiece and the uprights etc. In the case of the loader/unloader type workpiece conveyors, it is required to install a shuttle carriage between every adjacent pair of press machines, so that a large scale system and, in consequence, a large installation space are involved. In addition, since the workpiece needs to be transferred between the shuttle carriage and the work station, there is a possibility that a delivery error may occur. As described above, a large-scale system structure is unavoidably involved in any of the above conventional workpiece conveyors and therefore they have difficulties in achieving increased handling speed and productive efficiency.

As an attempt to solve the above problems, the present applicant has already proposed a workpiece conveyor for use in a tandem press line in the earlier invention (Japanese Patent Application No. 2001-400849), which provides high workpiece delivery speed, with relatively slim configuration. As illustrated in FIGS. 27(a), 27(b), the workpiece conveyor 240 of this earlier invention is designed to have lift beams 241 extending in the workpiece conveying direction T; carriers 242 and sub carriers 243 which are movable along the longitudinal direction of the lift beams 241; and a cross bar 245 with vacuum cups 244 disposed between the right and left pair of sub carriers 243 and serving as a workpiece holding means.

In the workpiece conveyor 240 of the earlier invention, the lift beams 241 are upwardly and downwardly moved by activation of lift axis servo motors 246, thereby upwardly and downwardly moving the vacuum cups 244 through the carriers 242, the sub carriers 243 and the cross bar 245. By moving the carriers 242 in the longitudinal direction of the lift beams 241 by activation of linear motors (not shown) each interposed between a lift beam 241 and a carrier 242 and making the sub carriers 243 offset in the moving direction of the carriers 242 by linear motors (not shown) each interposed between a carrier 242 and a sub carrier 243, the cross bar 245 and the vacuum cups 244 are moved in the workpiece conveying direction T. In this way, two orthogonal drive axis positions (more particularly, the position with respect to the vertical direction and/or the position with respect to the workpiece conveying direction T) are controlled, thereby controlling the moving trajectory of the vacuum cups 244, in other words, the trajectory of conveyance of the workpiece W.

The workpiece conveyor 240 of the earlier invention, however, has proved unsuccessful in overcoming the foregoing drawbacks. Specifically, the rigidity of the lift beams 241 needs to be increased in order to achieve high positioning accuracy, resulting in an increase in the size of the lift beams 241, and the lift beams 241 need to be entirely moved up and down when moving the cross bar 245 up and down so that large-sized servo motors are necessary as the servo motors 246, increasing the whole size of the system and the cost as a logical consequence. In addition, since the ends of each lift beam 241 are located within the zone of the die carry-in-and-out passage, replacement of the die is required to be carried out after the lift beams 241 are once lifted out of the die carry-in-and-out passage, which leads to poor productive efficiency.

The present invention is directed to overcoming the above shortcomings and a primary object of the invention is therefore to provide a workpiece conveyor for a press line, which has a simple small-sized structure thereby providing cost reduction, and offers an increased degree of freedom in setting a motion pattern and improved productive efficiency.

DISCLOSURE OF THE INVENTION

The above object can be accomplished by a workpiece conveyor for a press line according to a first aspect of the invention, which has a cross bar for supporting a workpiece through workpiece retaining means for detachably retaining the workpiece, wherein a cross bar supporting member for supporting the cross bar is movably attached, through a linear movement mechanism, to a rocking element which is oscillating-driven along a workpiece conveying direction, thereby making the relative distance between the center of oscillation of the rocking element and the cross bar variable.

According to the invention, since the cross bar supporting member is movably attached to the rocking element through the linear movement mechanism, the cross bar can be moved from a position at which the relative distance between the cross bar and the center of oscillation of the rocking element is relatively short to a position at which the above relative distance takes the maximum value that is structurally possible. With this arrangement, the oscillation component of the rocking element and the linear movement component of the cross bar supporting member moved by the linear movement mechanism are combined, thereby ensuring a wider moving range for the cross bar than that of the prior art. Thus, the workpiece conveyor can be installed so as not to interfere with the die carry-in-and-out passage while, at the same time, ensuring a desired cross bar moving range, so that die replacement can be easily and quickly carried out, resulting in improved productive efficiency. In addition, the motion of the cross bar can be arbitrarily set by controlling the oscillation of the rocking element and the linear movement caused by the linear movement mechanism, for instance, in such a way that changes in the height of the cross bar due to the oscillation of the rocking element is substantially compensated by the linear movement caused by the linear movement mechanism and that, in some cases, the cross bar is arbitrarily moved up and down. The effect of such control can be obtained by a simple, compact structure in which the cross bar supporting member is attached to the oscillating driven rocking element through the linear movement mechanism, so that cost reduction can be achieved.

In the invention, the cross bar may be attached to the rocking element through at least one link. This makes it possible to vary the relative distance between the center of oscillation of the rocking element and the cross bar by the link mechanism, leading to a further improvement in the degree of freedom in setting a motion pattern.

According to a second aspect of the invention, there is provided a workpiece conveyor for a press line, which has a cross bar for supporting a workpiece through workpiece retaining means for detachably retaining the workpiece, wherein the cross bar is attached, through at least one link, to a rocking element which is oscillating-driven along a workpiece conveying direction, thereby making the distance between the center of oscillation of the rocking element and the cross bar variable.

In the invention, the cross bar is attached to the rocking element, which is oscillating-driven along the workpiece conveying direction, through at least one link, thereby making the distance between the center of oscillation of the rocking element and the cross bar variable, so that the cross bar can be moved, similarly to the first aspect of the invention, from a position at which the relative distance between the cross bar and the center of oscillation of the rocking element is relatively short to a position at which this relative distance takes the maximum value that is structurally possible.

According to each aspect of the invention, the press line may be a transfer press and the rocking element may be supported by and suspended from a supporting column structural member through a support shaft, the supporting column structural member vertically hanging from a crown of the transfer press.

Where the workpiece conveyor is thus applied to a transfer press, the optimum motion pattern for each work station can be set and the degree of freedom can be considerably increased compared to the prior art, by installing the workpiece conveyor in accordance with the operation for carrying the workpiece into and out of the processing position in each work station.

According to each aspect of the invention, the press line may be a tandem press line in which a plurality of independent press machines are arranged in a line, and the rocking element may be supported by and suspended from a beam through a support shaft, the beam being held between adjacent press machines. Alternatively, the press line may be a tandem press line in which a plurality of independent press machines are arranged in a line, and the rocking element may be mounted on a carrier through a support shaft, the carrier being movable along a beam held between adjacent press machines. With this arrangement, in a tandem press line, the optimum motion pattern can be set for each work station and the degree of freedom can be considerably increased compared to the prior art.

In this case, the preferred number of beams provided between the press machines is one. This enables a more simplified structure and therefore further cost reduction. Since no workpiece conveyor is installed on the side of the inner side faces of uprights, there is no need to widen the space between the uprights so that the main bodies of the press machines can be downsized, leading to cost reduction. Further, the workpiece conveyor is applicable to reconstruction (retrofitting) of existing presses whose upright spacing is unadjustable.

Additionally, it is preferable to provide tilting means for tilting the workpiece in upward and downward directions by driving the cross bar so as to rotate about its long axis. Use of such tilting means allows the workpiece to be tilted upwardly and downwardly so as to offset the inclination of the workpiece inevitably caused by the oscillation of the rocking element. This makes it possible to maintain the workpiece in a horizontal condition so that carrying of the workpiece into and out of a processing position can be more smoothly reliably carried out.

BRIEF DESCRIPTION OF THE DRAWINGS

FIGS. 4(a) and 4(b) are a plan view and a side view, respectively, of the workpiece conveyor according to the first embodiment.

FIGS. 6(a) and 6(b) are an essential part sectional and plan view and an essential part sectional and side view, respectively, of the workpiece conveyor according to the second embodiment.

FIGS. 14(a) and 14(b) are an essential part sectional view taken along line H—H of FIG. 13 and an essential part sectional view taken along line I—I of FIG. 14(a), respectively.

FIG. 27(a) is a general schematic front view of a prior art tandem press line and FIG. 27(b) is an essential part enlarged front view of a workpiece conveyor employed in the tandem press line shown in FIG. 27(a).

BEST MODE FOR CARRYING OUT THE INVENTION

Referring now to the accompanying drawings, the workpiece conveyor for a press line of the invention will be described according to preferred embodiments.

[I] Applications to a Transfer Press

First of all, examples (first to fourth embodiments) where the invention is applied to a transfer press will be explained.

First Embodiment

Figure 1:
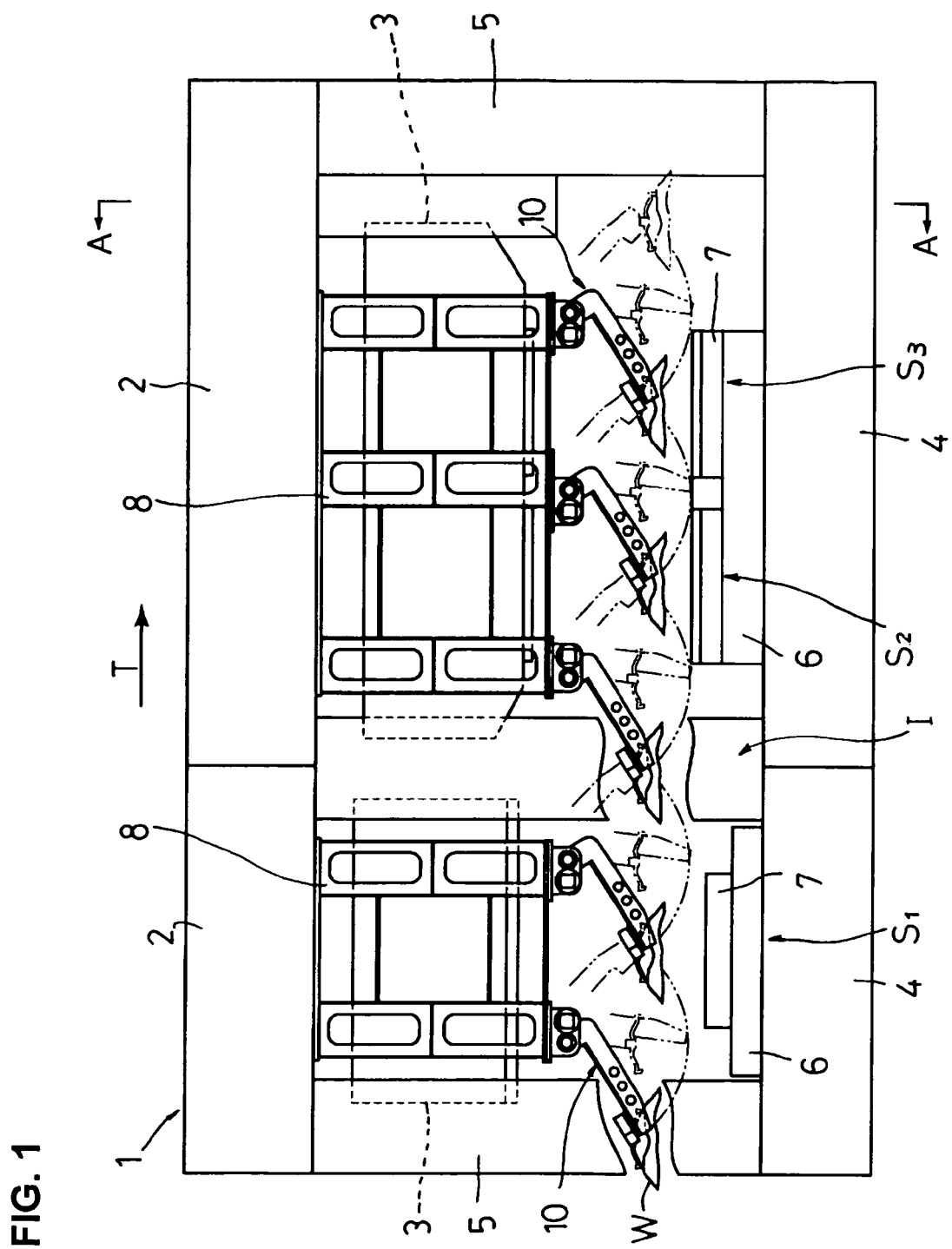
FIG. 1 is a general schematic front view of a transfer press according to a first embodiment of the invention.
Figure 2:
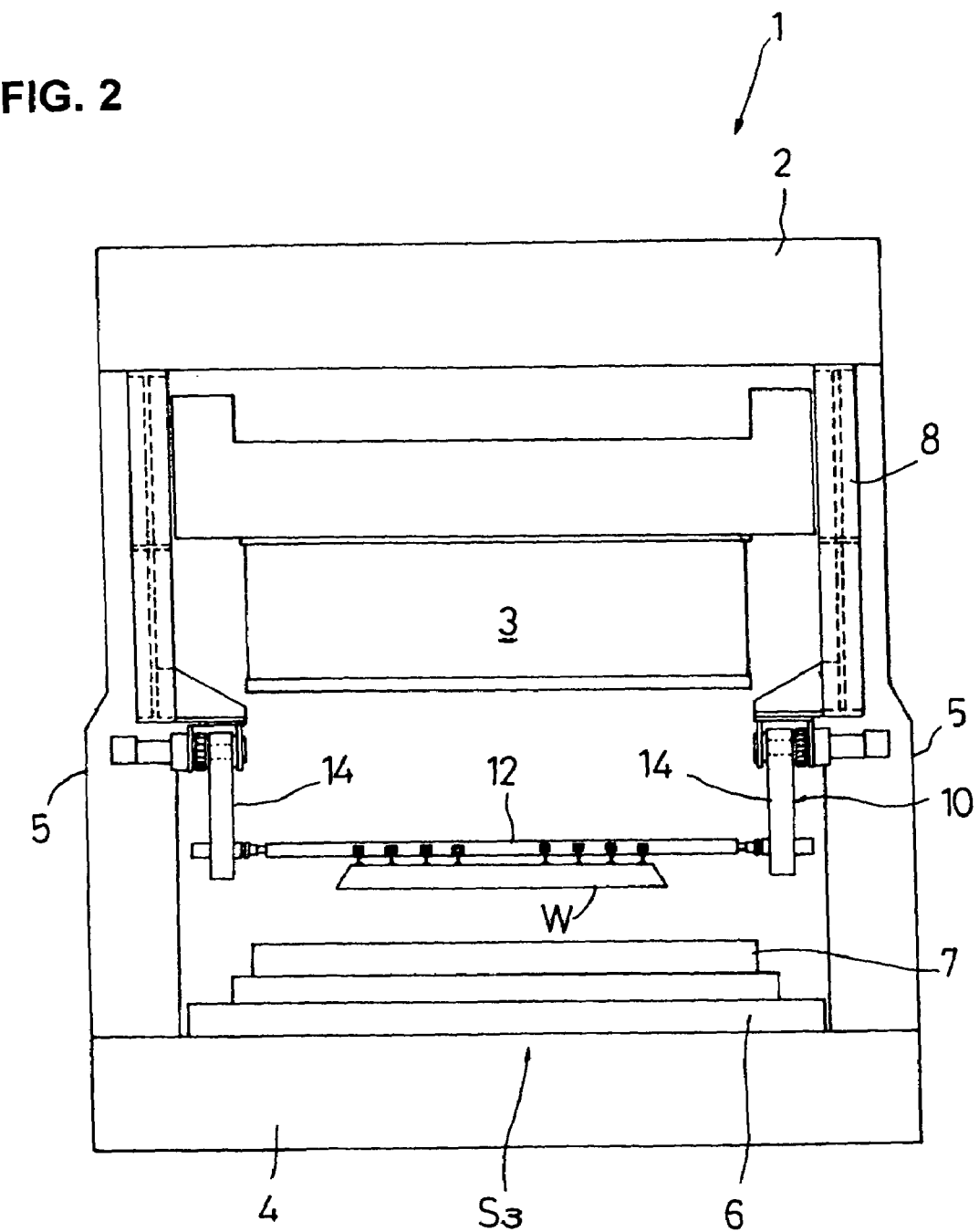
FIG. 2 is an essential part side view taken along line A—A of FIG. 1.

FIG. 1 shows a general schematic front view of a transfer press according to a first embodiment of the invention. FIG. 2 shows an essential part side view taken along line A—A of FIG. 1.

A transfer press 1 according to the first embodiment has crowns 2, slides 3 and beds 4. In the transfer press 1, the crowns 2, uprights 5 and the beds 4 are integrated by tie rods (not shown) and press molding is performed using an upper die (not shown) attached to the underside of each slide 3 and a lower die 7 mounted on a moving bolster 6 opposed to the slide 3. Desired work stations $S_1$, $S_2$, $S_3$ and an idle station $I_1$ are provided in compliance with a process specification, and a desired number of workpiece conveyors 10 (five workpiece conveyors in this embodiment) are disposed according to the operation for carrying a workpiece W into or out of the processing position of each of the work stations $S_1$, $S_2$, $S_3$ and idle station $I_1$. Herein, the driving mechanism of the slide 3, which is omitted from the drawings though, includes a main motor controlled in response to a signal from a press controller; a flywheel rotatively driven by the main motor; a clutch and a brake; and a drive shaft rotatively driven by the flywheel through the clutch. Each workpiece conveyor 10 is attached to supporting column structural members 8 so as to be suspended therefrom, the structural members 8 being vertically suspended from the crown 2 and located at opposed positions with respect to a direction perpendicular to a workpiece conveying direction T. The workpiece W is transferred to the stations $S_1$, $I_1$, $S_2$, $S_3$ successively by the workpiece conveyors 10 in conjunction with the press operation, whereby a desired pressed product can be manufactured.

Figure 3:
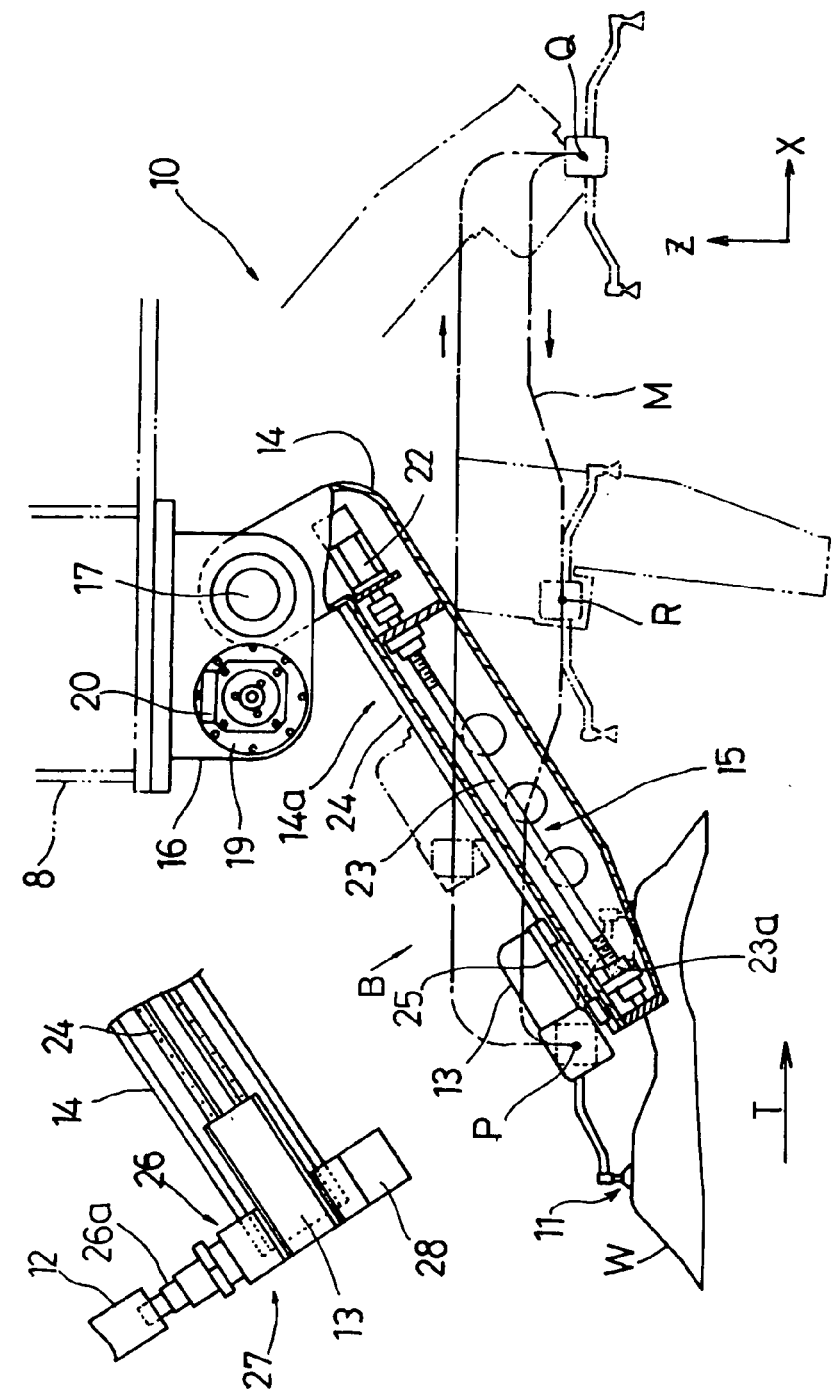
FIGS. 3(a) and 3(b) are an essential part sectional and front view and a view taken in the direction of arrow B of FIG. 3(a), respectively, which illustrate the structure and operation of a workpiece conveyor according to the first embodiment.

Reference is now made to FIGS. 3 and 4 to describe the structure of the workpiece conveyor 10. FIGS. 3(a) and 3(b) show an essential part sectional and front view and a view taken in the direction of arrow B of FIG. 3(a), respectively, which illustrate the structure and operation of the workpiece conveyor according to the first embodiment. FIGS. 4(a) and 4(b) show a plan view and side view, respectively, of the workpiece conveyor according to the first embodiment. As the workpiece conveyor 10 of the first embodiment is bilaterally symmetrical with respect to the workpiece conveying direction T, only the right part of the workpiece conveyor 10 is illustrated in FIGS. 3 and 4 for the sake of simplicity.

The workpiece conveyor 10 has a cross bar 12 for supporting the workpiece W suspended therefrom through a desired number of vacuum cups (workpiece retaining means) 11 for detachably retaining the workpiece W; a pair of cross bar carriers (cross bar supporting members) 13 for supporting the cross bar 12; a pair of feed levers (rocking elements) 14 oscillating-driven along the workpiece conveying direction T; and linear movement mechanisms 15 for linearly moving the cross bar carriers 13 relative to their associated feed levers 14. The feed levers 14 are each pivotally supported by a bracket 16 through a support shaft 17. The upper face of each bracket 16 is secured to the underside of the supporting column structural member 8 by a bolt, and the support shaft 17 is supported by these brackets 16 at both ends thereof. The feed levers 14 are located at a desired preset level, opposing to each other in a direction perpendicular to the workpiece conveying direction T such that they do not interfere with the slide 3. The cross bar 12 is laterally held between the opposed feed levers 14 so as to extend in a direction perpendicular to the workpiece conveying direction T (See FIG. 2).

Each feed lever 14 is a box-like structural member having a desired space therein and has an arm section 14a extending downwardly from its proximal end (at which the support shaft 17 is fitted in) along a plane that is apart from and parallel with the axis of the support shaft 17. Secured to the proximal end of the feed lever 14 is a driven gear 18 that is in turn secured to the support shaft 17 coaxially therewith (See FIGS. 4(a) and 4(b)).

A servo motor 20 is mounted on each bracket 16 through a reduction gear 19. A driving gear 21 is attached to the output shaft of the reduction gear 19, meshing with the driven gear 18. In this arrangement, torque output from each servo motor 20 is transmitted to its associated feed lever 14 through the reduction gear 19, the driving gear 21 and the driven gear 18 so that the feed lever 14 is oscillating-driven around the axis of the support shaft 17. It should be noted that the output shaft of the reduction gear 19 may be directly coupled to the support shaft 17 without interposition of the driving gear 21 and the driven gear 18. In this case, the support shaft 17 is pivotally supported by a bearing unit provided between the support shaft 17 and each bracket 16, and each feed lever 14 is coupled to the support shat 17 by a key (or spline) or the like.

Each linear movement mechanism 15 has a servo motor 22 and ball screw 23 which are disposed within the feed lever 14; a rolling direct-acting guide (linear guide) 24 mounted on the upper surface of the arm section 14a of the feed lever 14 so as to extend in a longitudinal direction as shown in FIG. 3(a); and a table 25 for fixing the cross bar carrier 13. By means of a ball nut 23a which is secured to the table 25 and into which the ball screw 23 is threaded and the ball screw 23 driven by the servo motor 22, the table 25 is allowed to linearly move on the rolling direct-acting guide 24. (The above-described mechanism is a so-called single-axis ball screw slider mechanism.) In this way, the activation of each servo motor 22 varies the relative distance between the center of oscillation of each feed lever 14 (the center of each support shaft 17) and the cross bar 12.

The cross bar carriers 13 each have a supporting device 26 composed of a rod section 26a fitted in a hole defined at an end face of the cross bar 12. The supporting device 26 is designed such that the rod section 26a is expanded and contracted in an axial direction by operating an air pressure feeding device (not shown). With this arrangement, attachment/detachment of the cross bar 12 can be readily done through the so-called one-touch operation. The cross bar carriers 13 are provided with a tilt mechanism (tilting means) 27 for tilting the workpiece W upward and downward. Each tilt mechanism 27 comprises a servo motor 28 attached to the cross bar carrier 13 and a power transmission mechanism (not shown) for transmitting the torque of the servo motor 28 to the rod section 26a, and is designed such that when activating the servo motor 28, the cross bar 12 is rotated about its long axis through the movement of the rod section 26a, thereby tilting the workpiece W upward and downward. In the first embodiment, the workpiece W is kept in a horizontal condition by tilting the workpiece W with the tilt mechanisms 27 so as to counterbalance the inclination of the workpiece W caused by the oscillation of the feed levers 14, whereby the workpiece W can be more smoothly and reliably carried into and out of a work station.

In this embodiment, the servo motors 20, 22 and 28 are respectively provided with a position detector (i.e., encoder not shown) for detecting the present position and a positional signal from each position detector is input to a workpiece conveyor controller (not shown) for controlling the workpiece conveyor 10. In the workpiece conveyor controller, the workpiece W is moved in conjunction with the press operation according to a motion pattern based on data on the present positions output from the position detectors and data on the present positions of the slides 3 output from the press controller.

As discussed earlier, the workpiece conveyor 10 of the first embodiment is such that the cross bar carriers 13 are moved relative to their associated feed levers 14 with the linear movement mechanisms 15 whereby the cross bar 12 is moved from a position where the relative distance between the cross bar 12 and the center of oscillation of each feed bar 14 (the center of each support shaft 17) is relatively short to a position where the relative distance takes the maximum value that is structurally possible. By combining the oscillation of the feed levers 14 caused by activation of the servo motors 20 and the linear movement of the cross bar carriers 13 caused by activation of the servo motors 22, the cross bar 12 is moved over a wide range. At that time, the motion of the cross bar 12 is arbitrarily determined by controlling the activation of the servo motors 20 and 22.

In the first embodiment, the workpiece conveyor 10 is driven according to a motion pattern based on a motion program input to the workpiece conveyor controller, in order to avoid interference between the workpiece W conveyed by the workpiece conveyor 10 and the dies. In FIG. 3(a), chain line M indicates an example of the motion pattern. In this example, the workpiece W is adsorbed at an adsorption point P and raised from the lower die 7 in a preceding work station (e.g., $S_2$, See FIG. 1) in the direction of the Z axis. Then, the workpiece W is conveyed in the direction of the X axis to a position above the lower die 7 of the next station ($S_3$) and lowered in the direction of the Z axis to be put in the lower die 7 and released from the adsorption at a releasing point Q. For returning to the preceding station ($S_2$), the workpiece W is once raised, and after passing through a wait point R located at a lower position, the workpiece W is again moved up and down to be put back to the adsorption point P, thereby completing one cycle.

According to the first embodiment, since the workpiece conveyors 10 are arranged in accordance with the operation of carrying the workpiece W into and out of the work stations $S_1$, $I_1$, $S_2$, $S_3$, and the optimum motion pattern M can be set for every work station $S_1$, $I_1$, $S_2$, $S_3$, the motion table can be freely set according to the types of the dies. As a result, the degree of freedom can be increased to a considerable extent, compared to the prior art. In addition, since conveyance of the workpiece W is carried out by cooperation of the plurality of independently controllable workpiece conveyors 10 and the driving means for each workpiece conveyor 10 is constructed such that the rocking mechanisms and the linear movement mechanisms 15 are consolidated in the feed levers 14, the structure of the workpiece conveyors 10 can be simplified and downsized which obviates the need for a large installation space. In consequence, improved visibility and maintainability as well as cost reduction can be achieved. Further, since the technique for supporting and hanging the workpiece conveyors 10 with the supporting structural members 8 suspended from the crown 2 is employed, the workpiece conveyors 10 can be installed at desired positions, leading to an increased degree of freedom in installation.

Second Embodiment

Figure 5:
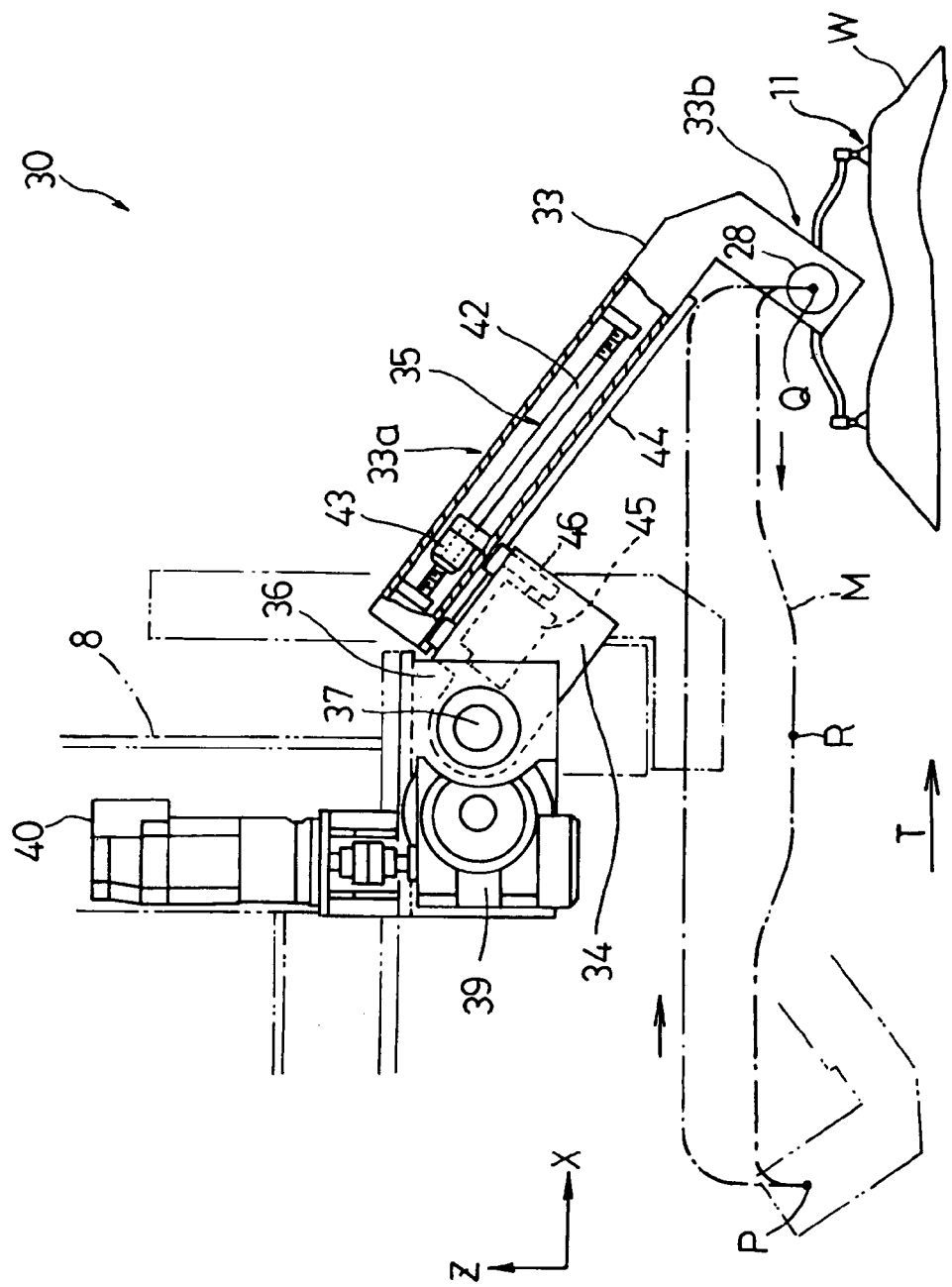
FIG. 5 is an essential part sectional and front view illustrating the structure and operation of a workpiece conveyor according to a second embodiment of the invention.

Next, reference is made to FIGS. 5 and 6 to describe a workpiece conveyor according to a second embodiment of the invention. FIG. 5 shows an essential part sectional and front view illustrating the structure and operation of the workpiece conveyor according to the second embodiment. FIGS. 6(a) and 6(b) show an essential part sectional and plan view and an essential part sectional and side view, respectively, of the workpiece conveyor according to the second embodiment. Similarly to the workpiece conveyor 10 of the first embodiment, a workpiece conveyor 30 of the second embodiment is bilaterally symmetrical with respect to the workpiece conveying direction T, and therefore only the right part of the workpiece conveyor 30 is illustrated in FIGS. 5 and 6 for the sake of simplicity. In the second embodiment, the parts similar to those of the first embodiment are designated by the same reference numerals as given to the first embodiment and a detailed description thereof will be omitted.

The workpiece conveyor 30 of the second embodiment has a cross bar 12 for supporting the workpiece W suspended therefrom through a desired number of vacuum cups (workpiece retaining means) 11 for detachably retaining the workpiece W; a pair of feed levers (cross bar supporting members) 33 for supporting the cross bar 12; a pair of rocking tables (rocking elements) 34 oscillating-driven along the workpiece conveying direction T; and linear movement mechanisms 35 for linearly moving the feed levers 33 relative to their associated rocking tables 34. Each rocking table 34 is secured to a pivotal support shaft 37 by a coupling means such as a key (or spline) or the like, the pivotal support shaft 37 being pivotally supported on a bracket 36 secured to the underside of the supporting structural member 8, with the help of bearing units located on both sides of the rocking table 34. The rocking tables 34 are disposed at a desired preset level so as not to interfere with the slide 3, opposing to each other in a direction perpendicular to the workpiece conveying direction T. The cross bar 12 is laterally held between the opposed feed levers 33, extending in a direction perpendicular to the workpiece conveying direction T.

Each rocking table 34 is a box-like structural member having a desired space therein and a substantially cubic overall configuration and provided with an insertion hole 34a which is defined at its proximal end and in which the pivotal support shaft 37 is fitted. A driven gear 38 is coaxially secured to one end of each pivotal support shaft 37 by a coupling means such as a key (or spline) or the like.

Mounted on each bracket 36 is a reduction gear 39. The input shaft of the reduction gear 39 is connected to the output shaft of a servo motor 40 through a coupling, whereas the output shaft of the reduction gear 39 is coaxially fixed to the output shaft of a driving gear 41 by a coupling means such as a key (or spline) or the like. The driving gear 41 meshes with the driven gear 38. In this arrangement, torque output from each servo motor 40 is transmitted to its associated rocking table 34 through the reduction gear 39, the driving gear 41, the driven gear 38 and the pivotal support shaft 37 so that the rocking table 34 is driven so as to oscillate around the axis of the pivotal support shaft 37. The output shaft of the reduction gear 39 may be directly coupled to the pivotal support shaft 37 without interposition of the driving gear 41 and the driven gear 38.

Each feed lever 33 is a box-like structural member having a desired space therein and a substantially hook-shaped front view. Each feed lever 33 is composed of an arm section 33a extending along a plane opposite to the rocking table 34 and a projecting section 33b which projects from the distal end of the arm section 33a at right angles. Attached to the projecting section 33b are the aforesaid supporting device 26 and the servo motor 28 which drives the rod section 26a of the supporting device 26 so as to rotate about its axis.

Each linear movement mechanism 35 has a ball screw 42 disposed within the feed lever 33 with both ends being securely supported by the feed lever 33; a ball nut 43 into which the ball screw 42 is threaded; a rolling direct-acting guide (linear guide) 44 inserted between the rocking table 34 and the feed lever 33, being attached to a plane of the arm section 33a of the feed lever 33 so as to extend in a longitudinal direction; a servo motor 45 disposed within the rocking table 34; and a power transmitting means 46 for transmitting the torque of the servo motor 45 to the ball nut 43. With the ball nut 43 driven by the servo motor 45, the feed lever 33 is linearly moved, being guided by the rolling direct-acting guide 44. In this way, the activation of each servo motor 45 varies the relative distance between the center of oscillation of each rocking table 34 (the center of each pivotal support shaft 37) and the cross bar 12.

The same effect as in the first embodiment can be obtained with the workpiece conveyor 30 of the second embodiment having the above structure, and the same motion pattern M as in the first embodiment can be effectuated by combining the oscillation component of the rocking tables 34 and the linear movement component of the feed levers 33. In the first embodiment, during the movement of the workpiece conveyor 10 according to the motion pattern M, the arm sections 14a of the feed levers 14 thrust largely and downwardly, because of the structure in which the feed levers 14 are oscillated while linearly moving the cross bar carriers 13 relative to the feed levers 14 with the aid of the linear movement mechanisms 15. In contrast with this, the workpiece conveyor 30 of the second embodiment is designed such that the rocking tables 34 are oscillated, while linearly moving the feed levers 33 relative to the rocking tables 34 by the linear movement mechanisms 35, so that the feed levers 33 do not thrust largely downwardly even when the workpiece conveyor 30 is moved according to the motion pattern M. As a result, the degree of freedom in installation/design can be increased.

Third Embodiment

Figure 7:
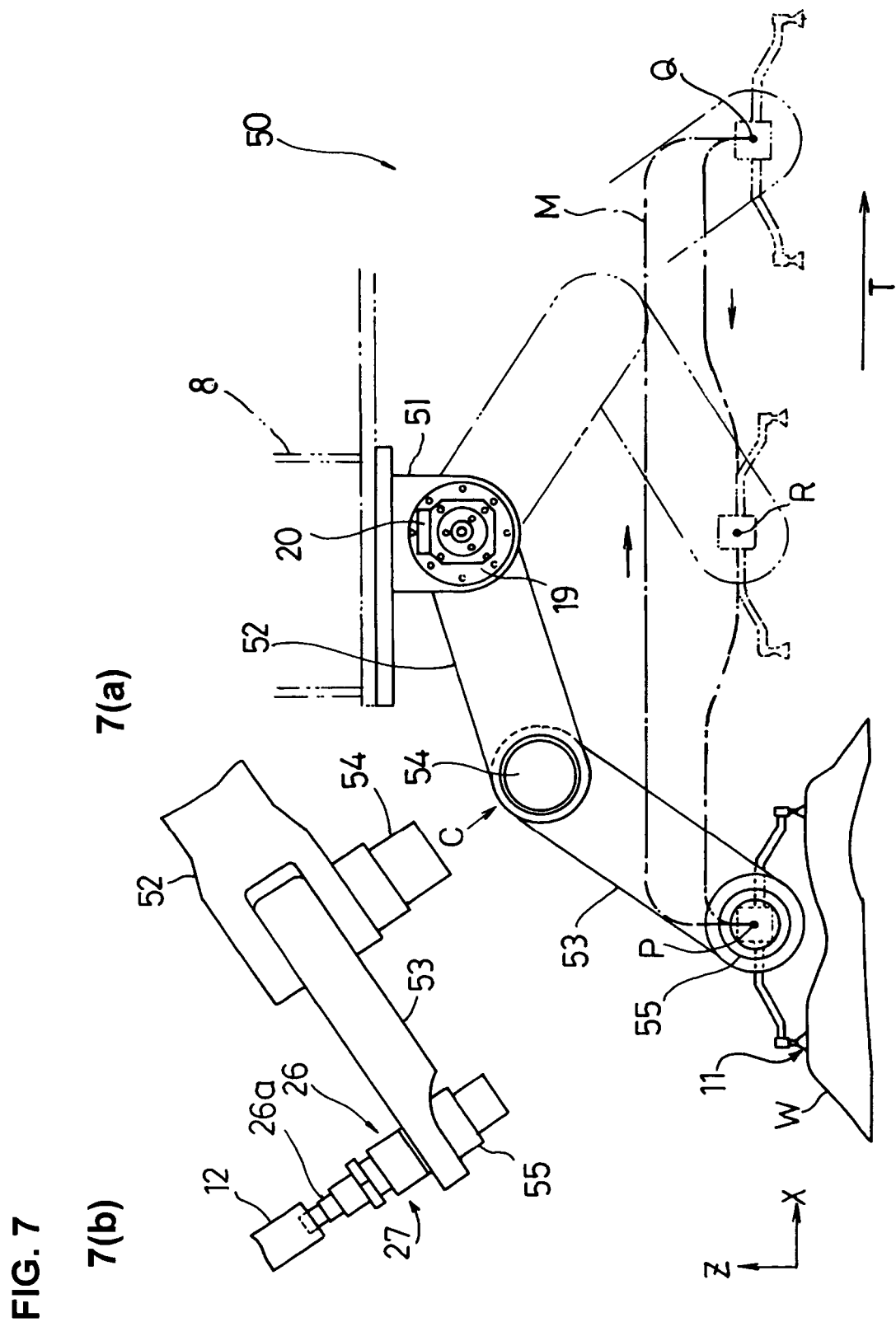
FIGS. 7(a) and 7(b) are a front view and a view taken in the direction of arrow C of FIG. 7(a), respectively, which illustrate the structure and operation of a workpiece conveyor according to a third embodiment of the invention.

FIGS. 7(a) and 7(b) show a front view and a view taken in the direction of arrow C of FIG. 7(a), respectively, which illustrate the structure and operation of a workpiece conveyor according to a third embodiment of the invention. In FIGS. 7(a), 7(b), the parts similar to those of the foregoing embodiments are designated by the same reference numerals as given to the foregoing embodiments.

A workpiece conveyor 50 according to the third embodiment has, at one side, a first arm (rocking element) 52 the proximal end of which is pivotally attached to a clevis-type bracket 51 secured to the underside of the supporting column structural member 8; and a second arm (corresponding to "at least one link" of the invention) 53 the proximal end of which is pivotally attached to the distal end of the first arm 52. The first arm 52 is oscillating-driven relative to the bracket 51 by activation of the servo motor 20 mounted on the bracket 51 through the reduction gear 19, whereas the second arm 53 is oscillating-driven relative to the first arm 52 by activation of a reduction-gear contained type servo motor 54 mounted on the distal end of the first arm 52. Mounted on the distal end of the second arm 53 are the aforesaid supporting device 26 and a reduction-gear contained type servo motor 55 for driving the rod section 26a of the supporting device 26 so as to pivot about its axis. In this arrangement, activation of the servo motor 20 causes the cross bar 12 to oscillate around the pivotal point at the proximal end of the first arm 52, whereas activation of the servo motor 54 causes a movement for varying the relative distance between the pivotal point at the proximal end of the first arm 52 and the cross bar 12.

The same effect as in the foregoing embodiments can be basically attained with the workpiece conveyor 50 of the third embodiment, and the same motion pattern M as in the first embodiment can be effectuated by combining the oscillation component of the first arms 52 and the oscillation component of the second arms 53. In addition, since the same motion pattern M as in the first embodiment can be realized by the two-link bending action performed by each pair of first arm 52 and second arm 53, the first arms 52 and the second arms 53 both do not largely, downwardly thrust and, in consequence, the degree of freedom in installation/design can be increased like the second embodiment.

Fourth Embodiment

Figure 8:
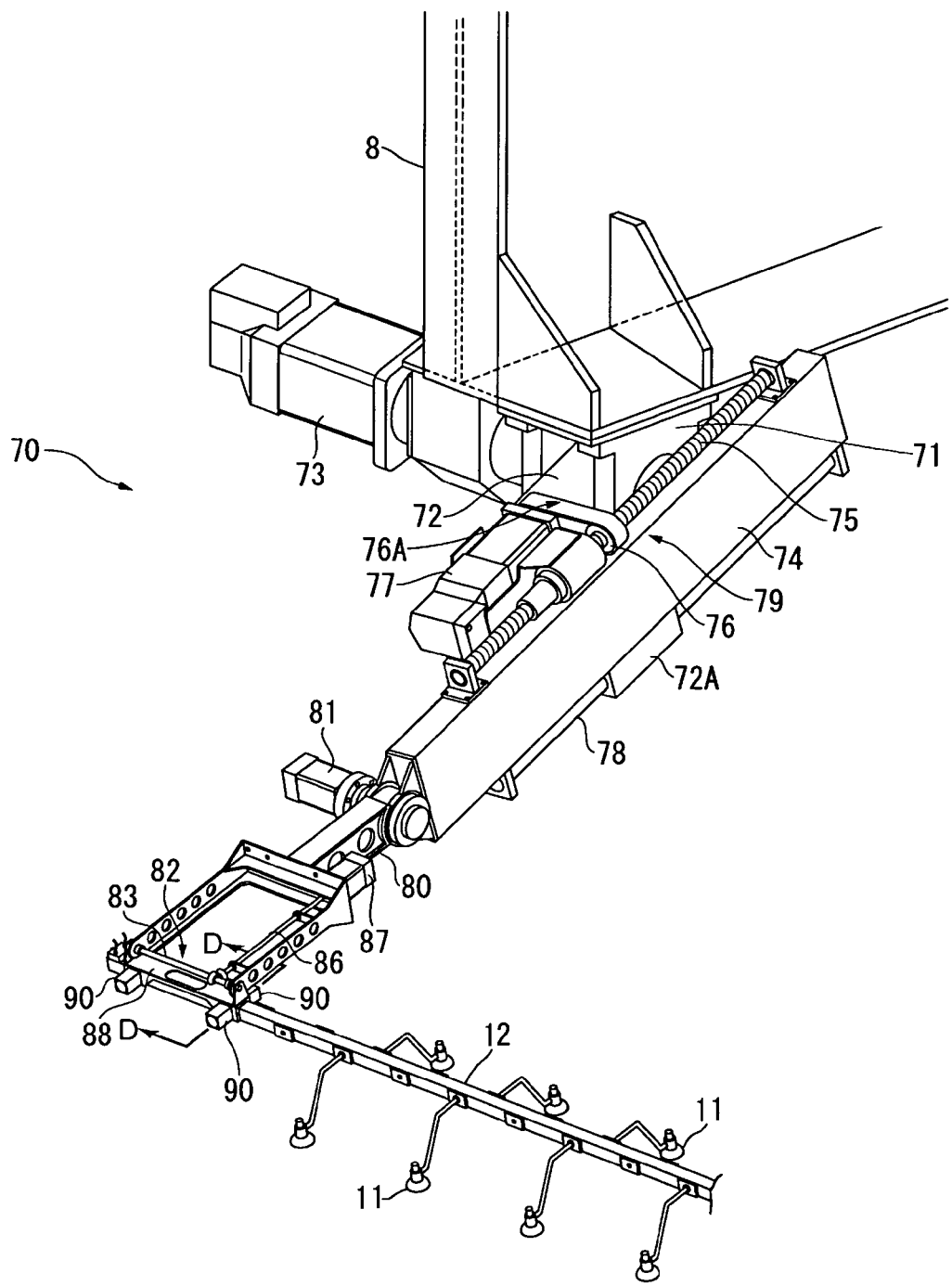
FIG. 8 is a perspective view of a workpiece conveyor according to a fourth embodiment of the invention.
Figure 9:
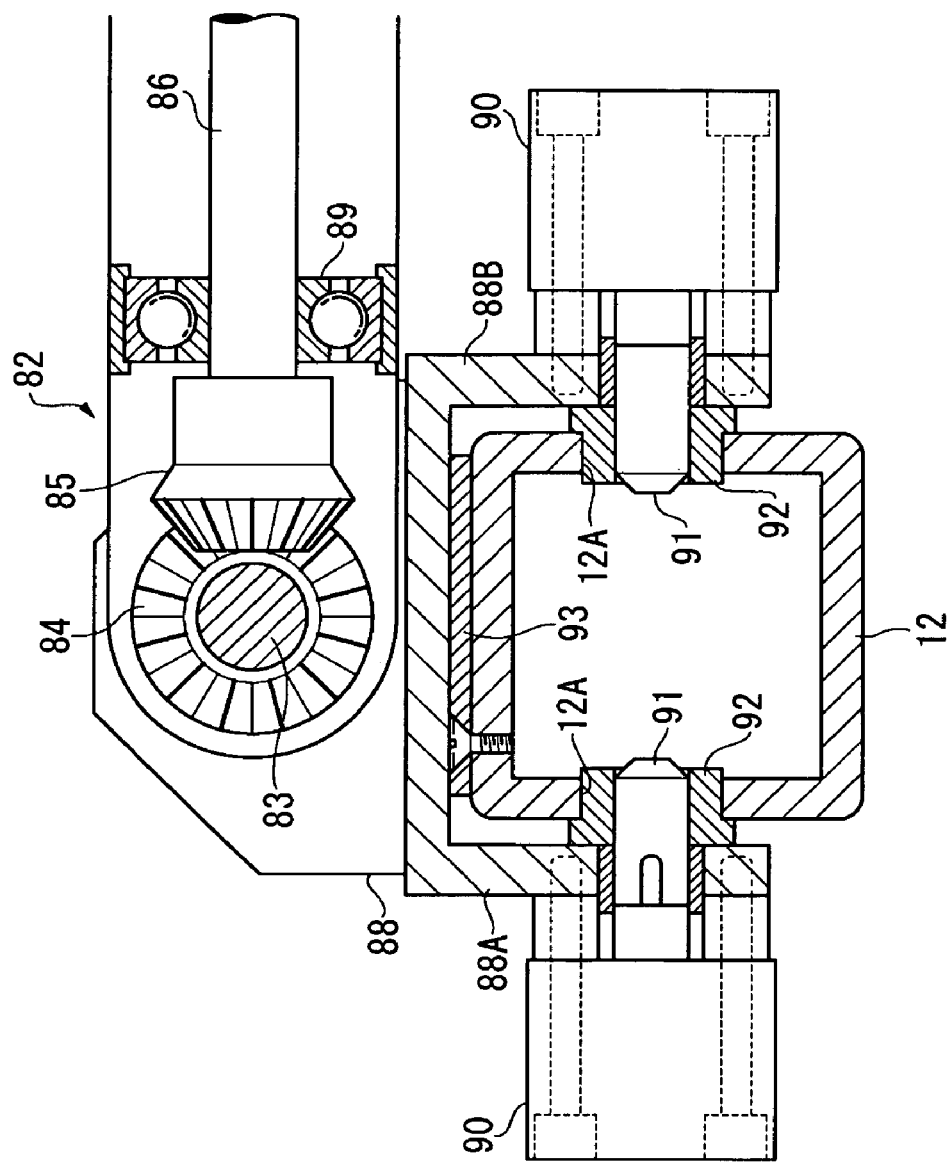
FIG. 9 is an essential part sectional view taken along line D—D of FIG. 8.

FIG. 8 shows a perspective view of a workpiece conveyor according to a fourth embodiment of the invention. FIG. 9 shows an essential part sectional view taken along line D—D of FIG. 8. Similarly to the workpiece conveyors 10, 30, 50 of the foregoing embodiments, a workpiece conveyor 70 of the fourth embodiment is bilaterally symmetrical with respect to the workpiece conveying direction T, and therefore, only one side of the workpiece conveyor 70 is illustrated in FIG. 8 for the sake of simplicity. In this embodiment, the parts identical with or similar to those of the foregoing embodiments are designated by the same reference numerals as given to the foregoing embodiments and a detailed description thereof will be omitted.

As shown in FIG. 8, in the workpiece conveyor 70 of the fourth embodiment, a rocking table (rocking element) 72 is attached to a bracket 71 secured to the underside of the supporting column structural member 8 and is pivotally driven by a servo motor 73. Attached to the rocking table 72 is a feed lever (cross bar supporting member) 74. In this embodiment, a ball screw 75 is attached to the top surface of the feed lever 74 and the feed lever 74 is moved back and forth by rotating a ball nut 76, into which the ball screw 75 is threaded, with a servo motor 77. A rod-like direct-acting guide 78 is provided at the underside of the feed lever 74, being slidably supported by a supporting section 72A that is integral with the rocking table 72. The ball screw 75, the ball nut 76, the servo motor 77 and a power transmitting means 76A shown in FIG. 8 constitute a linear movement mechanism 79 to vary the relative distance between the center of oscillation of the rocking table 72 and the cross bar 12.

Attached to the distal end of the feed lever 74 is a proximal end of an arm 80 (corresponding to "at least one link" of the invention). The arm 80 is pivotally driven by a servo motor 81 disposed at the proximal end thereof. Specifically, in this embodiment, not only the linear movement mechanism 79 but also activation of the servo motor 81 varies the relative distance between the center of oscillation of the rocking table 72 and the cross bar 12. The cross bar 12 is mounted on a ⊤-shaped portion at the distal end of the arm 80 through a tilt mechanism 82.

As enlargedly illustrated in FIG. 9, the tilt mechanism 82 includes a driven shaft 83 pivotally supported at the distal end of the arm 80; a drive shaft 86 for driving the driven shaft 83 through a pair of bevel gears 84, 85; a servo motor 87 for driving the drive shaft 86 (See FIG. 8); and a retaining bracket 88 that pivots in an integral fashion with the driven shaft 83 while retaining the cross bar 12. The drive shaft 86 is supported on the arm 80 by use of a bearing 89 and the driven shaft 83 has the same support structure as that of the drive shaft 86.

In FIG. 9, the retaining bracket 88 of the tilt mechanism 82 has retaining pieces 88A, 88B that are opposed to each other. A plurality of air cylinders 90 (two air cylinders in the present embodiment) are attached to each retaining piece 88A,88B so as to extend along the longitudinal direction of the retaining bracket 88. Rods 91 extending from their associated air cylinders 90 are respectively inserted into insertion holes 12A formed in both side faces of the cross bar 12. By moving the rods 91 back and forth, the cross bar 12 can be attached to and detached from the retaining bracket 88 so that the cross bar 12 can be replaced with a new one according to the shape etc. of the workpiece W.

Fitted in each insertion hole 12A of the cross bar 12 into which the rod 91 is inserted is a guide member 92 for guiding the rod 91 for insertion while preventing the jar of the retaining bracket 88 and the cross bar 12. A pad 93 is attached to the upper surface of the cross bar 12 as shown in FIG. 9, for the purpose of preventing the jar of the cross bar 12 as well as adsorbing its oscillation or positioning the rods 91 with respect to their associated insertion holes 12A.

According to the workpiece conveyor 70 of the fourth embodiment, the arm 80 is pivotally attached to the end of each feed lever 74, which increases the degree of freedom in setting a motion pattern compared to the case where the cross bar 12 is mounted on the ends of the feed levers 74 (e.g., the second embodiment). As a result, the feed levers 74 and the arms 80 can be easily prevented from interfering with the slide 6 or dies.

Further, the workpiece conveyor 70 of the fourth embodiment includes the arms 80 pivotable on their associated feed levers 74 in addition to the linear movement mechanisms 79, which means that the workpiece conveyor 70 has both the structure of the second embodiment and the structure of the third embodiment and therefore can obtain the effects of these embodiments at the same time.

Although the workpiece conveyors 10, 30, 50, and 70 of the foregoing embodiments are attached to the supporting column structural members 8 so as to be suspended therefrom, the supporting column structural members 8 being vertically suspended from the crown 2, the invention is not limited to this but may be modified such that the workpiece conveyors 10, 30, 50, and 70 are attached to the uprights 5 through a desired attaching means so as to be suspended from the uprights 5. Alternatively, the workpiece conveyors 10, 30, 50, and 70 exemplified in the foregoing embodiments may be turned upside down and placed on the bed 4.

While the foregoing embodiments have been discussed with a case where the invention is applied to an ordinary transfer press, the invention is of course applicable to presses of other types such as the so-called module transfer press in which a crown, slide and bed are modularized as one unit for each process and the same uprights are shared by all the processes.

[II] Applications to a Tandem Press Line

Next, there will be explained embodiments (fifth to tenth embodiments) wherein the invention is applied to a tandem press line having a plurality of independent press machines arranged in a line.

Fifth Embodiment

Figure 10:
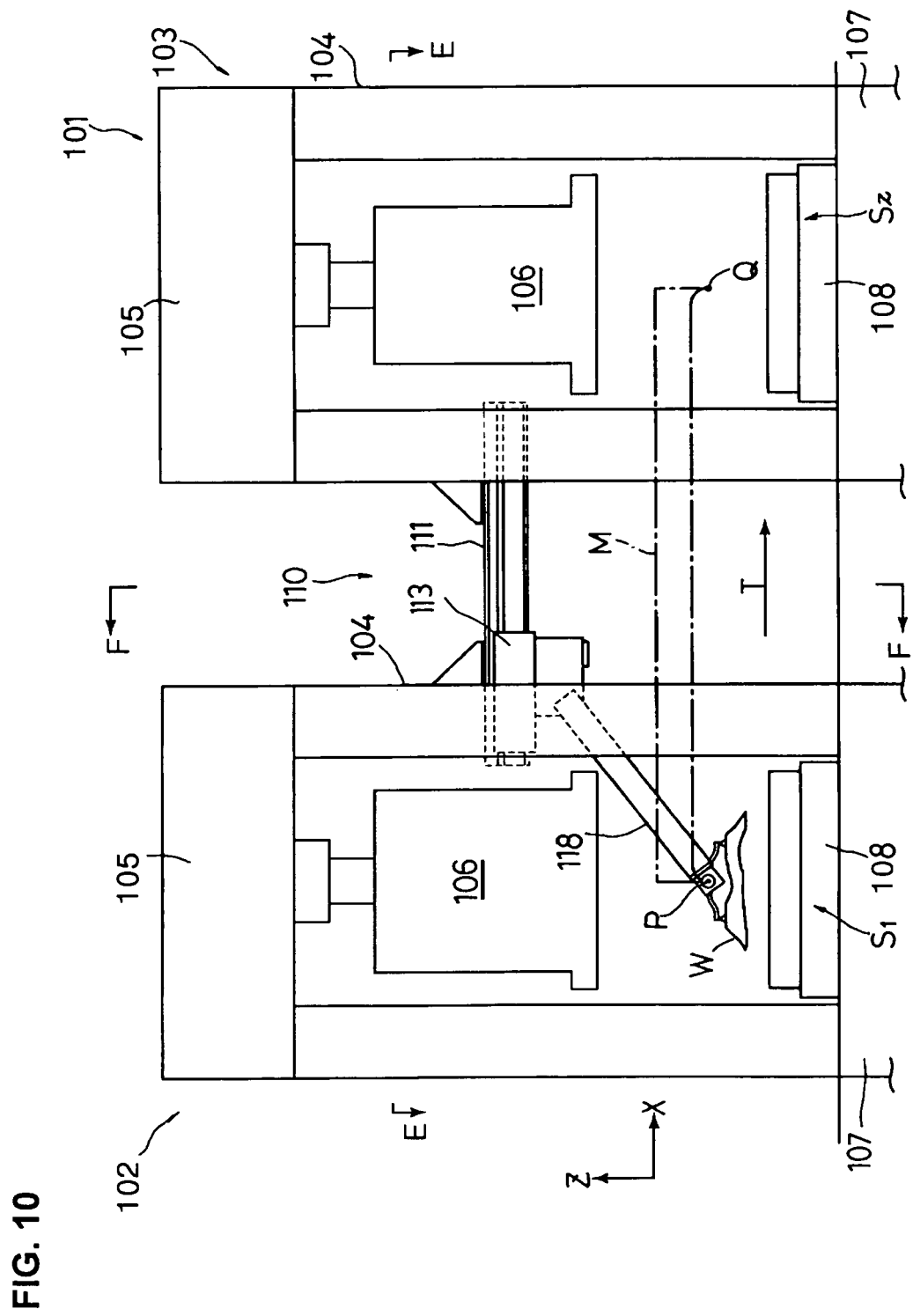
FIG. 10 is a general schematic front view of a tandem press line according to a fifth embodiment of the invention.
Figure 11:
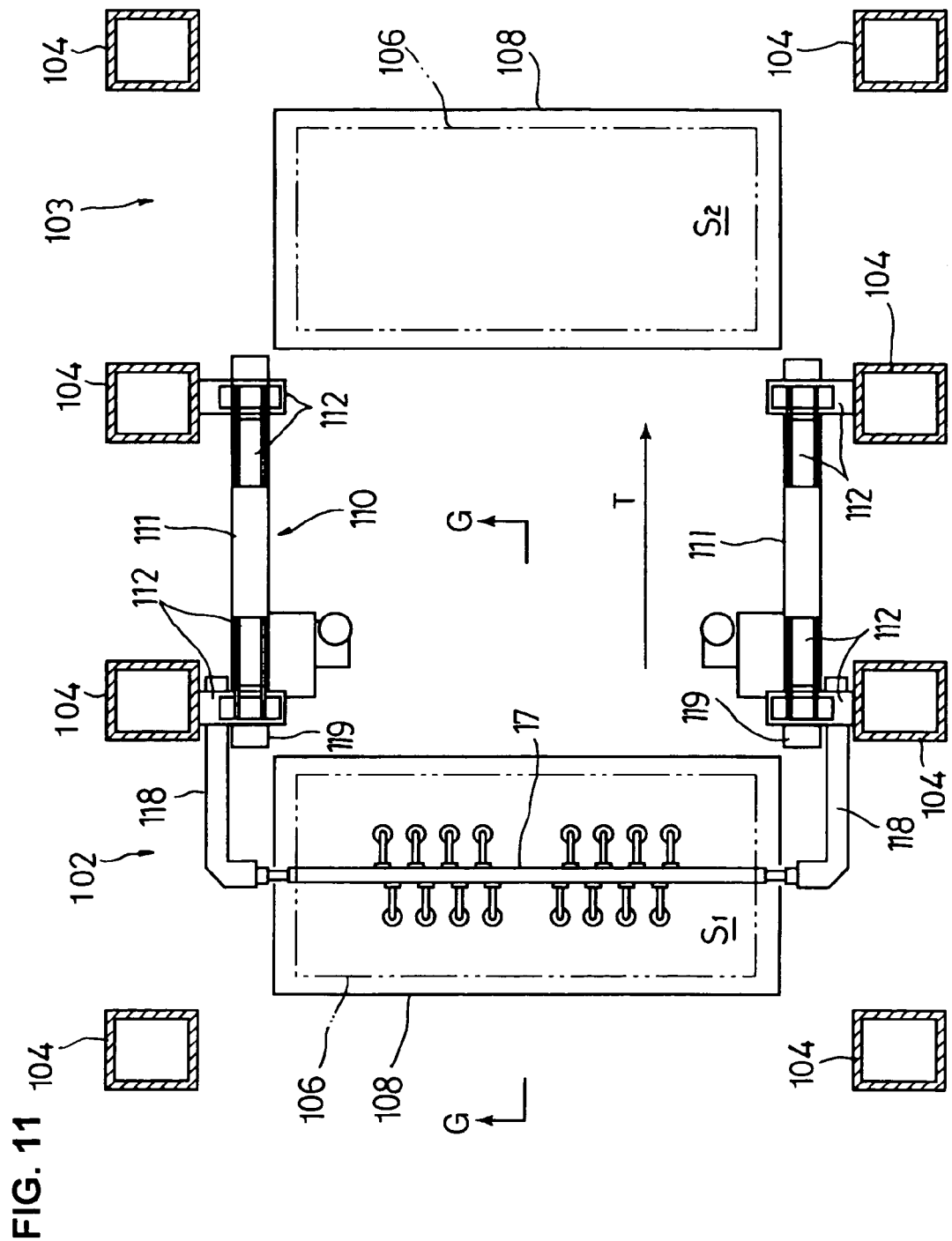
FIG. 11 is an essential part plan view taken along line E—E of FIG. 10.
Figure 12:
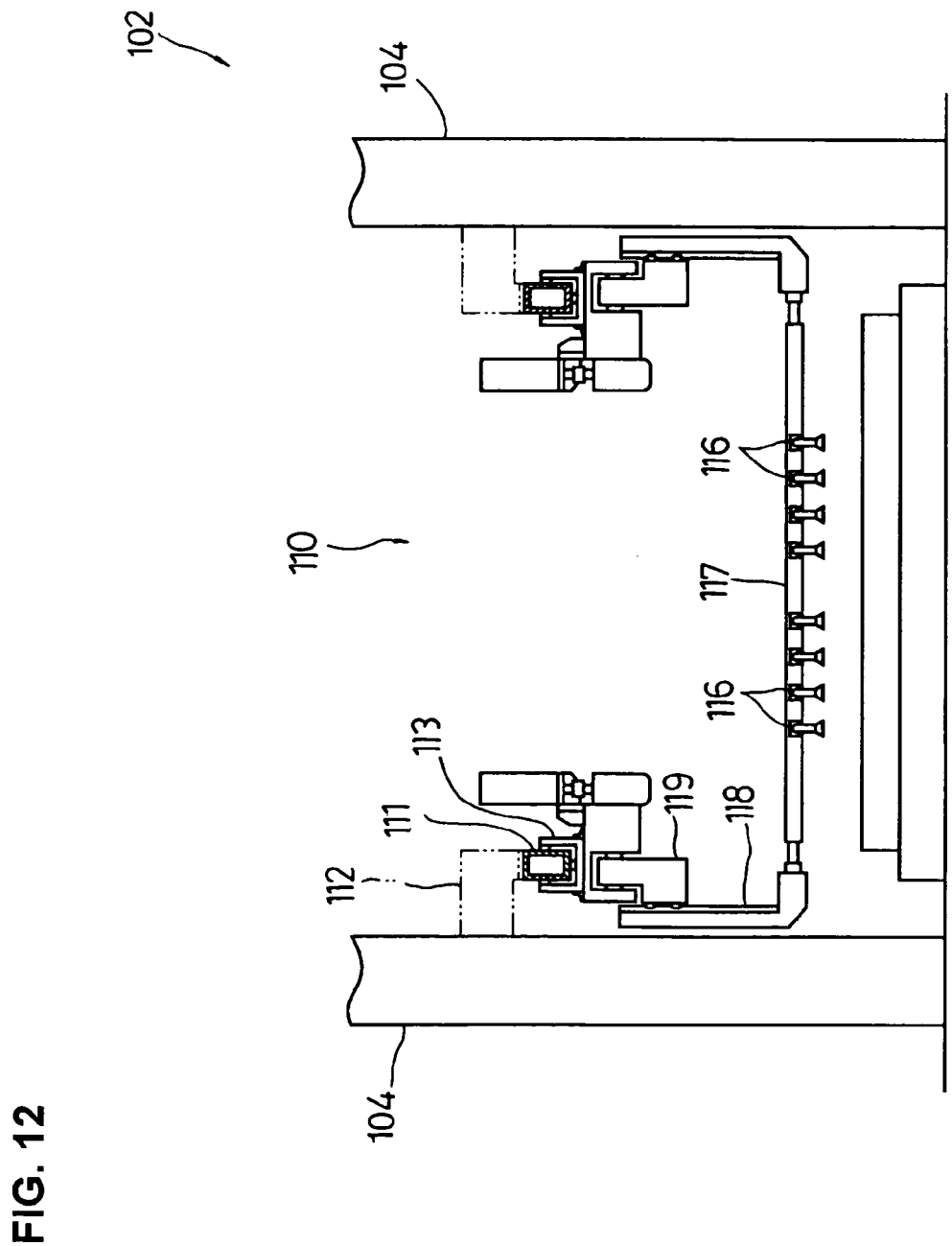
FIG. 12 is an essential part side view taken along line F—F of FIG. 10.

FIG. 10 shows a general schematic front view of a tandem press line according to a fifth embodiment of the invention. FIGS. 11 and 12 show an essential part plan view taken along line E—E of FIG. 10 and an essential part side view taken along line F—F of FIG. 10, respectively.

A tandem press line 101 of the fifth embodiment has a plurality of press machines 102, 103 (two press machines in this embodiment) which are aligned in series at specified intervals from the upstream (left side in figure) to the downstream; a material carry-in device (not shown) disposed upstream of the upstream press machine 102; a product carry-out device (not shown) disposed downstream of the downstream press machine 103; a workpiece conveyor (which is not shown and has the same structure as that of the workpiece conveyor 110 described later) for conveying a workpiece W from the material carry-in device to the work station of the upstream press machine 102; a workpiece conveyor 110 for delivering (carrying-in and carrying-out) the workpiece W between the work stations of the adjacent press machines 102, 103; and a workpiece conveyor (which is not shown and has the same structure as that of the above workpiece conveyor 110) for conveying the workpiece W from the work station of the downstream press machine onto the product carry-out device.

Each press machine 102 (103) comprises uprights 104 serving as a main body frame; an upper frame 105 located above the uprights 104 and housing a drive power transmission mechanism; a slide 106 supported by the uprights 104 so as to be vertically movable and vertically moved through the drive power transmission mechanism; and a moving bolster 108 disposed on a bed 107 and located at a position opposite to the slide 106. Each press machine 102 (103) is designed to press the workpiece W by means of an upper die (not shown) attached to the lower end of the slide 106 and a lower die (not shown) mounted on the upper end of the moving bolster 108.

Figure 13:
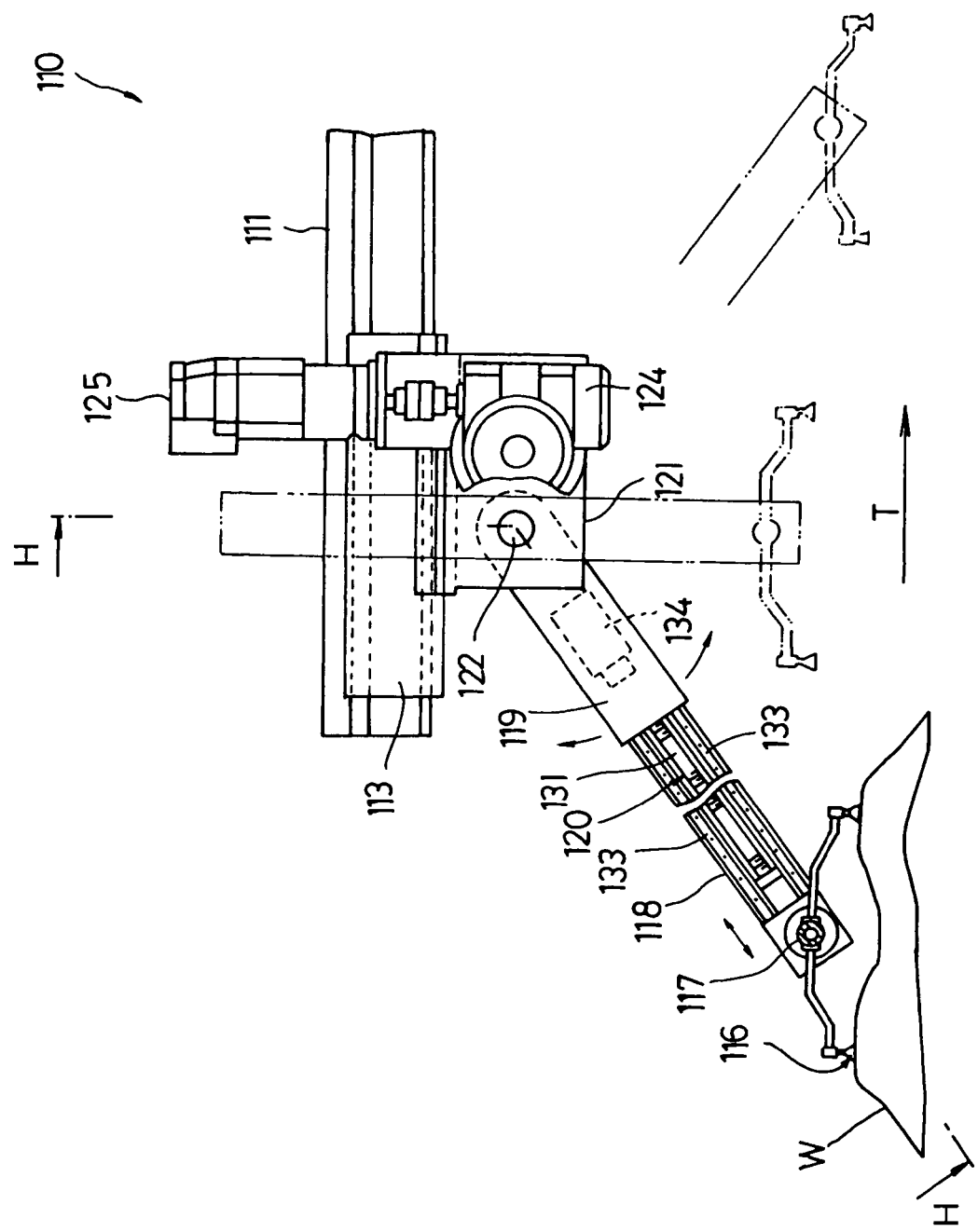
FIG. 13 is a front view (taken along line G—G of FIG. 11) illustrating the structure and operation of a workpiece conveyor according to the fifth embodiment.

Turning now to FIGS. 13 and 14, the structure of the workpiece conveyor 110 will be described. FIG. 13 shows a front view (taken along line G—G of FIG. 11) illustrating the structure and operation of the workpiece conveyor according to the fifth embodiment. FIGS. 14(*a*) and 14(*b*) show essential part sectional views taken along line H—H of FIG. 13 and taken along line I—I of FIG. 14(*a*), respectively. As the workpiece conveyor 110 of the fifth embodiment is bilaterally symmetrical with respect to the workpiece conveying direction T, only the left part of the workpiece conveyor 110 as viewed in the workpiece conveying direction T is illustrated in FIGS. 13 and 14 for the sake of simplicity.

The workpiece conveyor 110 of the fifth embodiment has a pair of beams 111 which are placed apart at right and left when viewed in the workpiece conveying direction T and located above the die carry-in-and-out passage (See FIGS. 10, 11). One end of each beam 111 is secured to the downstream upright 104 of the upstream press machine 102 through a supporting bracket 112 (See FIGS. 11, 12), whereas the other end being secured to the upstream upright 104 of the downstream press machine 103.

Each of the right and left beams 111 is provided with a carrier 113 that has a substantially U-shaped cross section and is disposed so as to fold the beam 111 from underneath. Each carrier 113 is movable in the longitudinal direction of the beam 111. As shown in FIG. 14(*a*), there are provided a pair of linear motors 114 as a moving means for moving the carrier 113 along its associated beam 111, one linear motor 114 being positioned between an outer side face of the beam 111 and an inner side face of the carrier 113 opposed thereto whereas the other linear motor 114 is positioned between the other outer side face of the beam 111 and the other inner side face of the carrier 113 opposed thereto. A first linear guide 115 is located between an upper position of one outer side face of the beam 111 and an inner side face of the carrier 113 opposed thereto and a second linear guide 115 is located between an upper position of the other outer side face of the beam 111 and the other inner side face of the carrier 113 opposed thereto. A third linear guide 115 is located between the underside of the beam 111 and the bottom face of the carrier 113 opposed thereto. Thus, the movement of the carrier 113 relative to its associated beam 111 is guided and supported at three points by these linear guides 115. Each linear motor 114 is composed of a magnet 114*a* disposed at an outer side face of the beam 111 so as to extend in the conveying direction (longitudinal direction) and a coil 114*b* disposed at an inner side face of the carrier 113 opposed to the magnet 114*a* so as to extend in the conveying direction (longitudinal direction). Specifically, the armature (the carrier 113) having the coils 114*b* is linearly moved by the change of the magnetic field formed on the stator (the beam 111) having the magnets 114*a*. It should be noted that the position of each carrier 113 relative to its associated beam 111 and the arrangement of the linear motors 114 and the linear guides 115 are not limited to those described above. For instance, the movement of each carrier 113 may be guided at two points by two linear guides 115.

The workpiece conveyor 110 of the fifth embodiment has a cross bar 117 for supporting the workpiece W suspended therefrom through a desired number of vacuum cups (workpiece retaining means) 116 for detachably retaining the workpiece W; a pair of feed levers (cross bar supporting members) 118 for supporting the cross bar 117; a pair of rocking tables (rocking elements) 119 oscillating-driven along the workpiece conveying direction T; and linear movement mechanisms 120 for linearly moving the feed levers 118 relative to their associated rocking tables 119. Each rocking table 119 is secured to a pivotal support shaft 122 by a coupling means such as a key (or spline) or the like, the pivotal support shaft 122 being pivotally supported on a bracket 121 secured to the underside of the carrier 113, with the help of bearing units located on both sides of the rocking table 119. The rocking tables 119 are aligned in a direction perpendicular to the workpiece conveying direction T, facing each other. The cross bar 117 is laterally held between the opposed feed levers 118, extending in a direction perpendicular to the workpiece conveying direction T (See FIG. 11).

Each rocking table 119 is a box-like structural member having a desired space therein and an insertion hole 119a defined at its proximal end to receive the pivotal support shaft 122 fitted therein. A driven gear 123 is coaxially secured to one end of the pivotal support shaft 122 by a coupling means such as a key (or spline) or the like.

Attached to the bracket 121 is a reduction gear 124. The input shaft of the reduction gear 124 is connected to the output shaft of a servo motor 125 through a coupling, whereas the output shaft of the reduction gear 124 is coaxially fixed to a driving gear 126 by a coupling means such as a key (or spline) or the like. The driving gear 126 meshes with the driven gear 123. In this arrangement, torque output from the servo motor 125 is transmitted to the rocking table 119 through the reduction gear 124, the driving gear 126, the driven gear 123 and the pivotal support shaft 122 so that the rocking table 119 is driven so as to oscillate around the axis of the pivotal support shaft 122. The output shaft of the reduction gear 124 may be directly coupled to the pivotal support shaft 122 without interposition of the driving gear 126 and the driven gear 123.

Each feed lever 118 is a box-like structural member having a desired space therein and a substantially hook-shaped side view. Each feed lever 118 is composed of an arm section 118a which extends along a plane opposed to the rocking table 119 and a projecting section 118b which inwardly projects from the distal end of the arm section 118a at right angles. Attached to the projecting section 118b is a supporting device 127 having a rod section 127a fitted in a hole defined at an end face of the cross bar 117. The supporting device 127 is designed such that the rod section 127a is expanded and contracted in an axial direction by operating an air feeding device (not shown). With this arrangement, attachment/detachment of the cross bar 117 can be readily done through the so-called one-touch operation.

Each feed lever 118 is provided with a tilt mechanism (tilting means) 128 for tilting the workpiece W upward and downward. The tilt mechanism 128 comprises a servo motor 129 attached to the projecting section 118b and a power transmission mechanism 130 for transmitting the torque of the servo motor 129 to the rod section 127a, and is designed such that activation of the servo motor 129 allows the cross bar 117 to be rotated about its long axis through the rod section 127a, thereby tilting the workpiece W upward and downward. In the fifth embodiment, the workpiece W is kept in a horizontal condition by tilting the workpiece W with the tilt mechanisms 128 so as to counterbalance the inclination of the workpiece W caused by the oscillation of the rocking tables 119, whereby the workpiece W can be more smoothly and reliably carried into and out of a work station.

Each linear movement mechanism 120 comprises a ball screw 131 disposed within the feed lever 118 with both ends being securely supported by the feed lever 118; a ball nut 132 into which the ball screw 131 is threaded; a rolling direct-acting guide (linear guide) 133 inserted between the rocking table 119 and the feed lever 118, being attached to a plane of the arm section 118a of the feed lever 118 so as to extend in the longitudinal direction of the arm section 118a; a servo motor 134 housed in the rocking table 119; and a power transmitting means 135 for transmitting the torque of the servo motor 134 to the ball nut 132. By means of the ball nut 132 driven by the servo motor 134, the feed lever 118 is linearly moved, being guided by the rolling direct-acting guide 133. In this way, the activation of the servo motor 134 varies the relative distance between the center of oscillation of the rocking table 119 (the center of the pivotal support shaft 122) and the cross bar 117.

In this embodiment, the servo motors 125, 129, 134 and the linear motor 114 are respectively provided with an encoder serving as a position detector (not shown) for detecting the present position and a linear scale (not shown). A positional signal from each position detector is input to a workpiece conveyor controller (not shown) for controlling the workpiece conveyor 110. In the workpiece conveyor controller, the workpiece W is moved in conjunction with the press operation according to a motion pattern based on data on the present positions output from the position detectors and data on the present positions of the slides 106 output from the press controller (not shown) for controlling the operation of the press machines 102, 103.

As discussed earlier, the workpiece conveyor 110 of the fifth embodiment is such that the feed levers 118 are moved relative to their associated rocking tables 119 with the linear movement mechanisms 120 whereby the cross bar 117 is moved from a position where the relative distance between the cross bar 117 and the center of oscillation of each rocking table 119 (the center of each support shaft 122) is relatively short to a position where the relative distance takes the maximum value that is structurally possible. By combining the oscillation of the rocking tables 119 caused by activation of the servo motors 125 and the linear movement of the feed levers 118 caused by activation of the servo motors 134, the cross bar 117 is moved over a wide range. At that time, the motion of the cross bar 117 is arbitrarily set by controlling the activation of the servo motors 125, 134. Further, the cross bar 117 is reciprocated between the work station $S_1$ of the upstream press machine 102 and the work station $S_2$ of the downstream press machine 3 by activation of the linear motors 114.

In the fifth embodiment, the workpiece conveyor 110 is driven according to a motion pattern based on a motion program input to the workpiece conveyor controller, in order to avoid interference between the workpiece W conveyed by the workpiece conveyor 110 and the dies. In FIG. 10, chain line M indicates an example of the motion pattern. In this example, the workpiece W is adsorbed at an adsorption point P and raised from the lower die of the preceding work station $S_1$ in the direction of the Z axis. Then, the workpiece W is conveyed in the direction of the X axis to a position above the lower die of the next station $S_2$ and lowered in the direction of the Z axis to be put in the lower die and released from the adsorption at a releasing point Q. For returning to the preceding station $S_1$, the workpiece W is once raised and then returned to the adsorption point P by way of a return line located under the above-described delivery line from $S_1$ to $S_2$, thereby completing one cycle.

According to the fifth embodiment, each feed lever 118 is connected through the linear movement mechanism 120 to the rocking table 119 that is oscillating-driven along the workpiece conveying direction T and the relative distance between the center of oscillation of each rocking table 119 (the center of each pivotal support shaft 122) and the cross bar 117 is made to be variable, so that a wide region can be ensured for the movement of the cross bar 117 by combining the oscillation component of the rocking tables 119 and the linear movement component of the feed levers 118. With this arrangement, carrying-in and carrying-out of the workpiece W can be performed without extending the beams 111 disposed between the adjacent press machines 102, 103 into the die carry-in-and-out passage. Accordingly, there is no need to lift the beams 111 out of the die carry-in-and-out passage for die replacement, which reduces the time required for die replacement, resulting in improved productive efficiency. In addition, arbitrary setting of a motion pattern for the cross bar 117 is possible, which brings about such an advantage that the trajectory of carrying-in and carrying-out of the workpiece W can be set in conformity to the movement of the dies. Further, the horizontal speed component derived from the composite movement obtained by combining the movement of the carriers 113 along the associated beams 111, the oscillation of the rocking tables 119 and the linear movement of the feed levers 118 is the workpiece delivery speed of the workpiece conveyor 110 substantially. Therefore, it is a matter of course that the workpiece W can be conveyed at high speed and, moreover, even if the speed component of each movement is relatively small, high speed operation can be expected by combining those speed components, so that cost reduction can be achieved through simplification and down-sizing of the system structure while ensuring improved productive efficiency.

Sixth Embodiment

Figure 15:
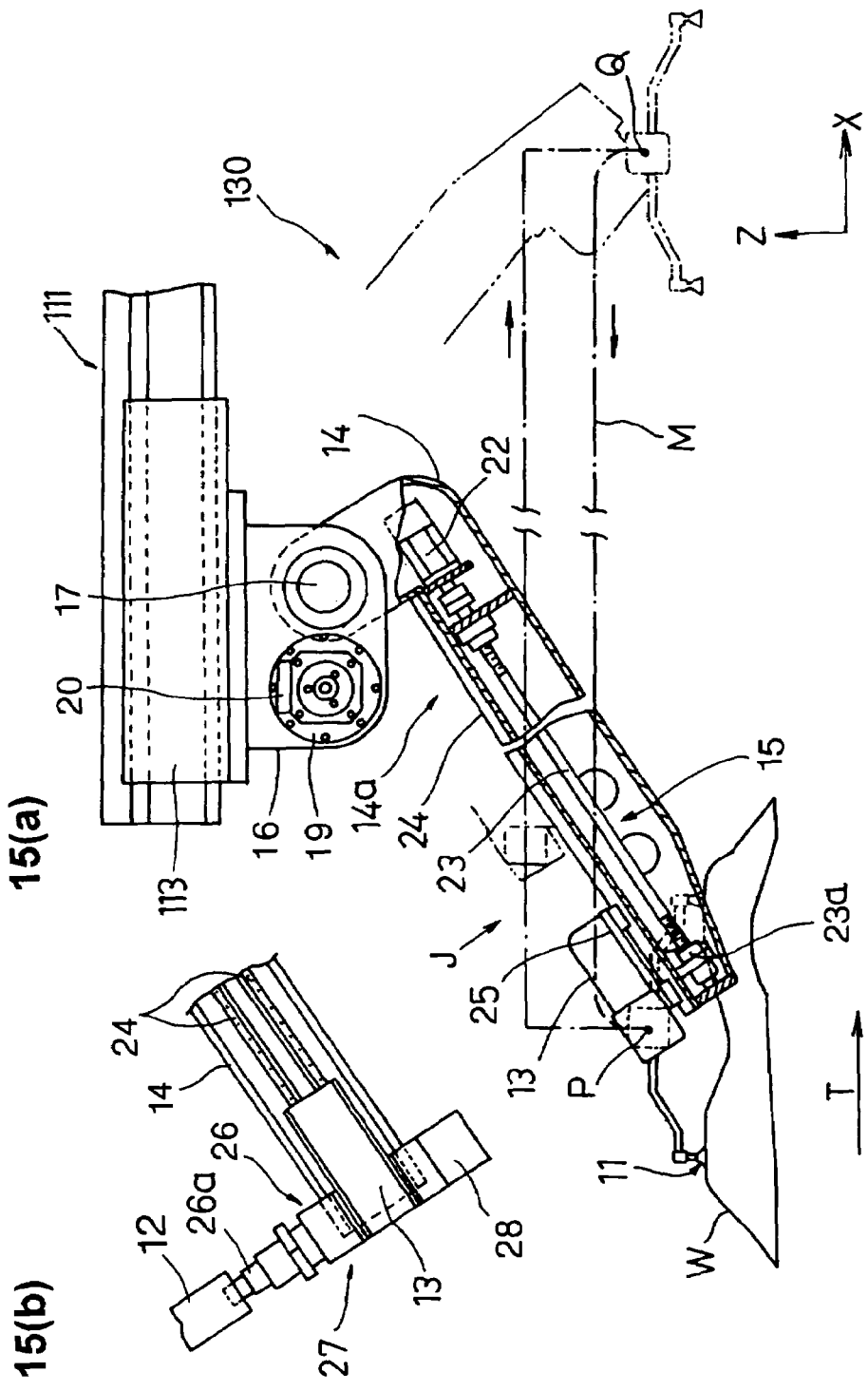
FIGS. 15(a) and 15(b) are an essential part sectional and front view and a view taken in the direction of arrow J of FIG. 15(a), respectively, which illustrate the structure and operation of a workpiece conveyor according to a sixth embodiment of the invention.

With reference to FIG. 15, there will be explained a workpiece conveyor according to a sixth embodiment of the invention. FIGS. 15(a) and 15(b) show an essential part sectional and front view and a view taken in the direction of arrow J of FIG. 15(a), respectively, which illustrate the structure and operation of the workpiece conveyor according to the sixth embodiment.

Similarly to the fifth embodiment, a workpiece conveyor 130 according to the sixth embodiment is constructed such that a bracket 16 is secured with a bolt to the underside of each carrier 113 that is movable in a longitudinal direction of the beam 111 and the feed lever 114 is pivotally supported by the support shaft 17 which is in turn supported at both ends thereof by the bracket 16. Except this point, the workpiece conveyor 130 basically does not differ from the workpiece conveyor 10 (See FIG. 3) of the first embodiment applied to a transfer press. Hence, in FIG. 15, the parts similar to those of the first embodiment are designated by the same reference numerals as in the first embodiment and a detailed description thereof is omitted.

In the workpiece conveyor 130 of the sixth embodiment having the above structure, the feed levers 14 downwardly largely thrust during oscillation of the feed levers 14. Therefore, the degree of freedom in installation/design is somewhat low in the sixth embodiment, compared to the fifth embodiment, but the sixth embodiment has the same effect as the fifth embodiment.

Seventh Embodiment

Figure 16:
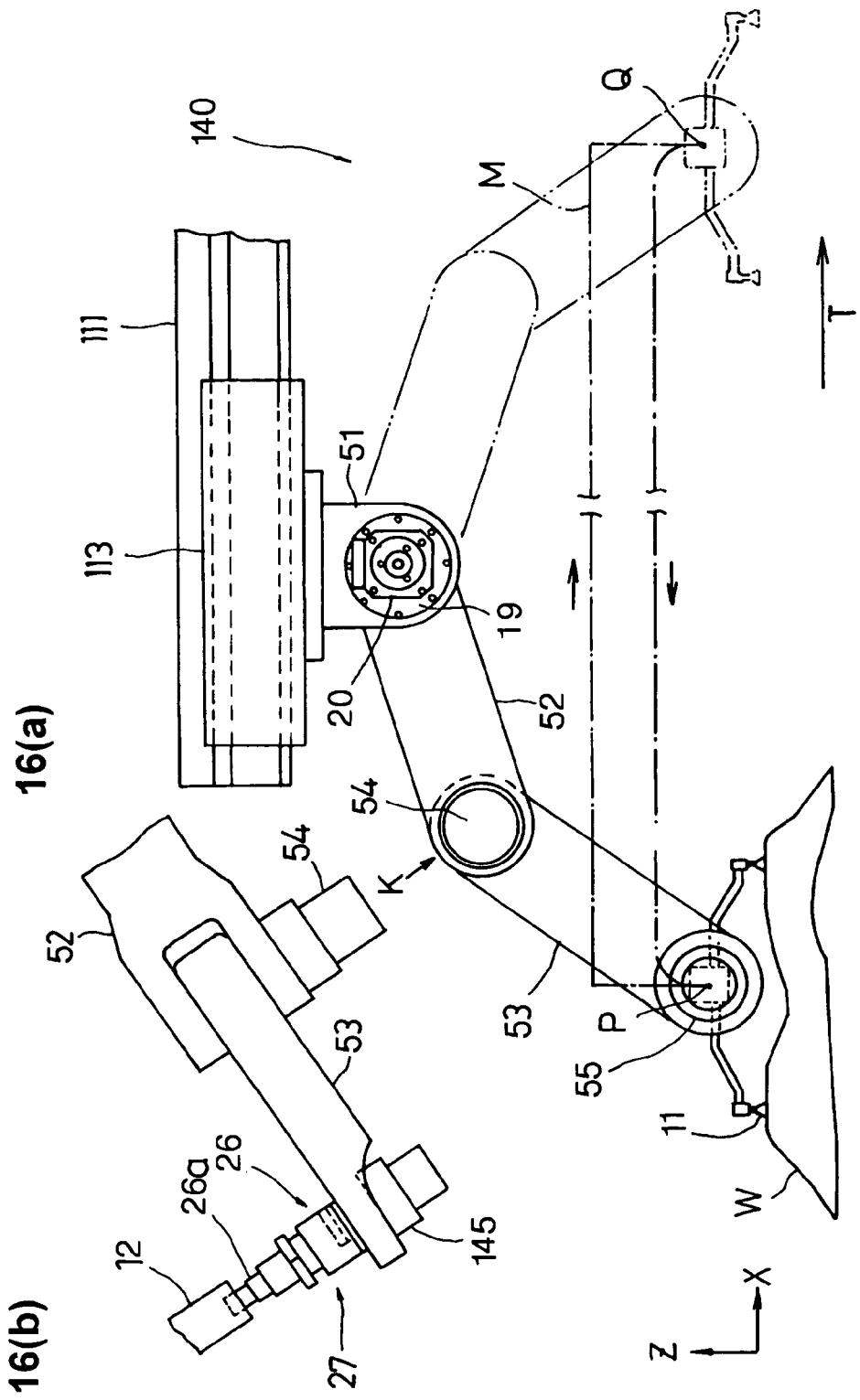
FIGS. 16(a) and 16(b) are a front view and a view taken in the direction of arrow K of FIG. 16(a), respectively, which illustrate the structure and operation of a workpiece conveyor according to a seventh embodiment of the invention.

FIGS. 16(a) and 16(b) are a front view and a view taken in the direction of arrow K of FIG. 16(a), respectively, which illustrate the structure and operation of a workpiece conveyor according to a seventh embodiment of the invention.

Similarly to the fifth and sixth embodiments, a workpiece conveyor 140 according to the seventh embodiment is constructed such that the clevis-type bracket 51 is secured to the underside of each carrier 113 that is movable in the longitudinal direction of the beam 111 and the proximal end of the first arm (rocking element) 52 is pivotally attached to the bracket 51. Except this point, the workpiece conveyor 140 basically does not differ from the workpiece conveyor 50 (See FIG. 7) of the third embodiment applied to a transfer press. Hence, in FIG. 16, the parts similar to those of the third embodiment are designated by the same reference numerals as in the third embodiment and a detailed description thereof is omitted.

The same effect as that of the fifth and sixth embodiments can be basically achieved by the workpiece conveyor 140 of the seventh embodiment and the same motion pattern M as in the fifth embodiment can be obtained by combining the oscillation component of the first arms 52 and the second arms 53 and the linear movement component of the carriers 113. As such a motion pattern M is enabled by bending of two links, that is, each pair of first arm 52 and second arm 53, neither the arms 52 nor the arms 53 thrust largely in a downward direction so that an increased degree of freedom in installation/design can be advantageously achieved like the fifth embodiment.

Eighth Embodiment

Figure 17:
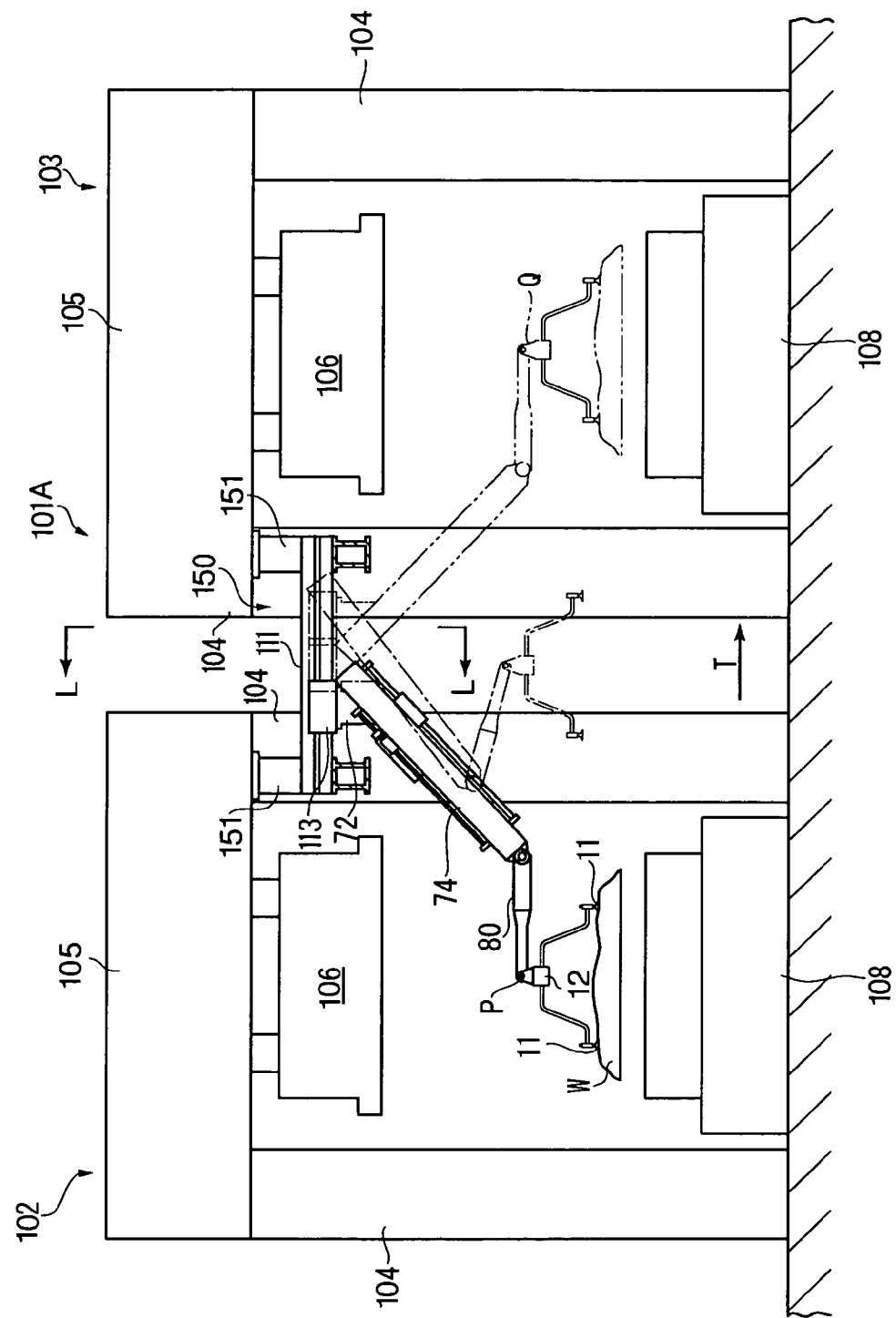
FIG. 17 is a general schematic front view of a tandem press line according to an eighth embodiment of the invention.
Figure 18:
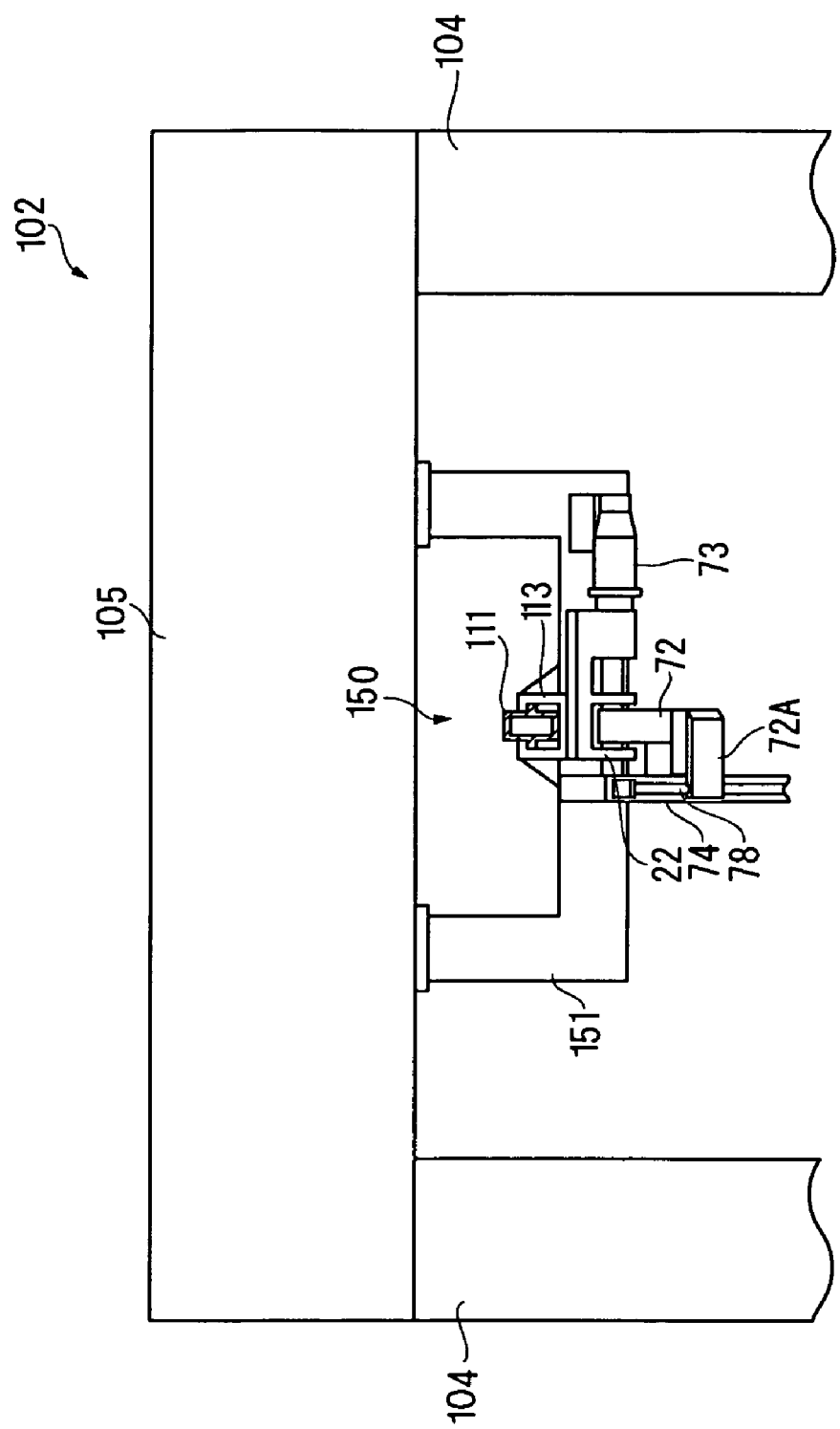
FIG. 18 is an essential part side view taken along line L—L of FIG. 17.
Figure 19:
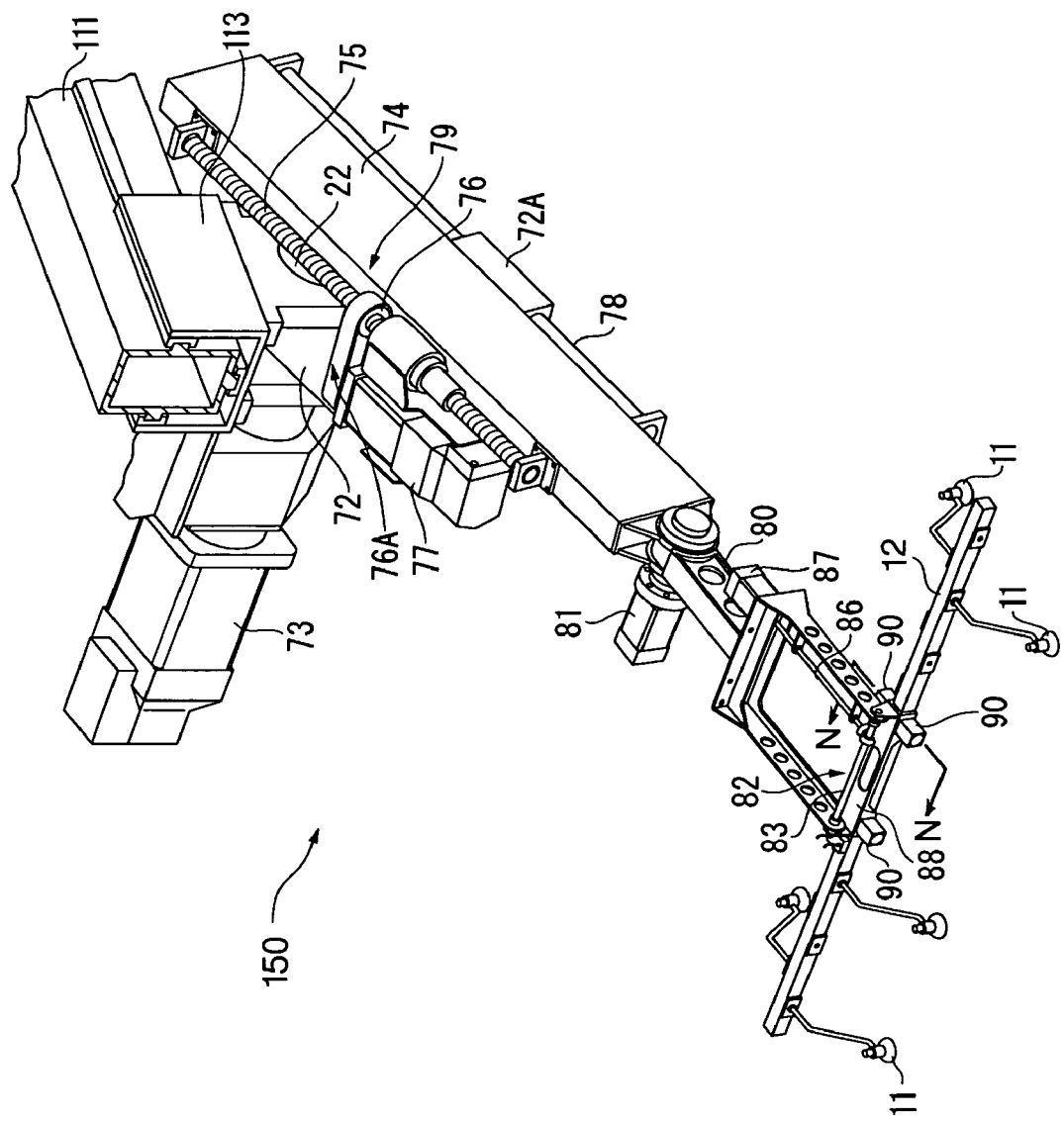
FIG. 19 is a perspective view of a workpiece conveyor according to the eighth embodiment.

FIG. 17 shows a general schematic front view of a tandem press line according to an eighth embodiment of the invention. FIG. 18 shows an essential part side view taken along line L—L of FIG. 17. FIG. 19 shows a perspective view of a workpiece conveyor according to the eighth embodiment. It should be noted that an essential part sectional view taken along line N—N of FIG. 19 is the same as FIG. 9 and therefore omitted.

A workpiece conveyor 150 used in a tandem press line 101A according to the eighth embodiment is supported by one beam 111. Each end of the beam 111 is secured to a U-shaped support frame 151 attached to the undersides of the upper frames 105. In each press machine 102, 103, the support frame 151 is located at the substantial center of the space between the uprights 104 aligned in a die carry-in-and-out direction.

The workpiece conveyor 150 has the carrier 113 which is movable along the beam 111 and to which the rocking table (rocking element) 72 is attached. The rocking table 72 is pivotally driven by the servo motor 73. Except this point, the workpiece conveyor 150 basically does not differ from the workpiece conveyor 70 (See FIG. 8) of the fourth embodiment applied to a transfer press. Hence, in the FIGS. 17, 18, 19, the parts similar to those of the fourth embodiment are designated by the same reference numerals as given to the fourth embodiment and a detailed description thereof is omitted.

According to the workpiece conveyor 150 of the eighth embodiment, the arm 80 is pivotally attached to the distal end of the feed lever 74, so that the interference between the feed lever 74 and/or the arm 80 and the slide 6 or the dies can be more easily avoided, compared to the case where the cross bar 17 is attached to the ends of the feed bars 74.

According to the workpiece conveyor 150 of the eighth embodiment, only one beam 111 is disposed between the press machines 102, 103. Accordingly, a more simplified structure can be attained compared to the foregoing embodiments provided with a right and left pair of beams and as a result, cost reduction can be further promoted. Additionally, since no workpiece conveyor 150 is installed on the side of the inner side faces of the uprights 104, the need to widen the spacing between the uprights 104 can be eliminated, which leads to downsizing of the main body parts of the press machines 102, 103 and further cost reduction. This further offers such a benefit that the workpiece conveyor 150 can be applied to reconstruction (retrofitting) of existing presses in which the spacing between the uprights 104 is unadjustable.

Further, the workpiece conveyor 150 of the eighth embodiment includes the arm 80 pivotable on the feed lever 74, in addition to the linear movement mechanism 79, which means that the workpiece conveyor 150 has both the structure of the fifth embodiment and the structure of the seventh embodiment and therefore can achieve the effects of these embodiments at the same time.

Ninth Embodiment

Figure 20:
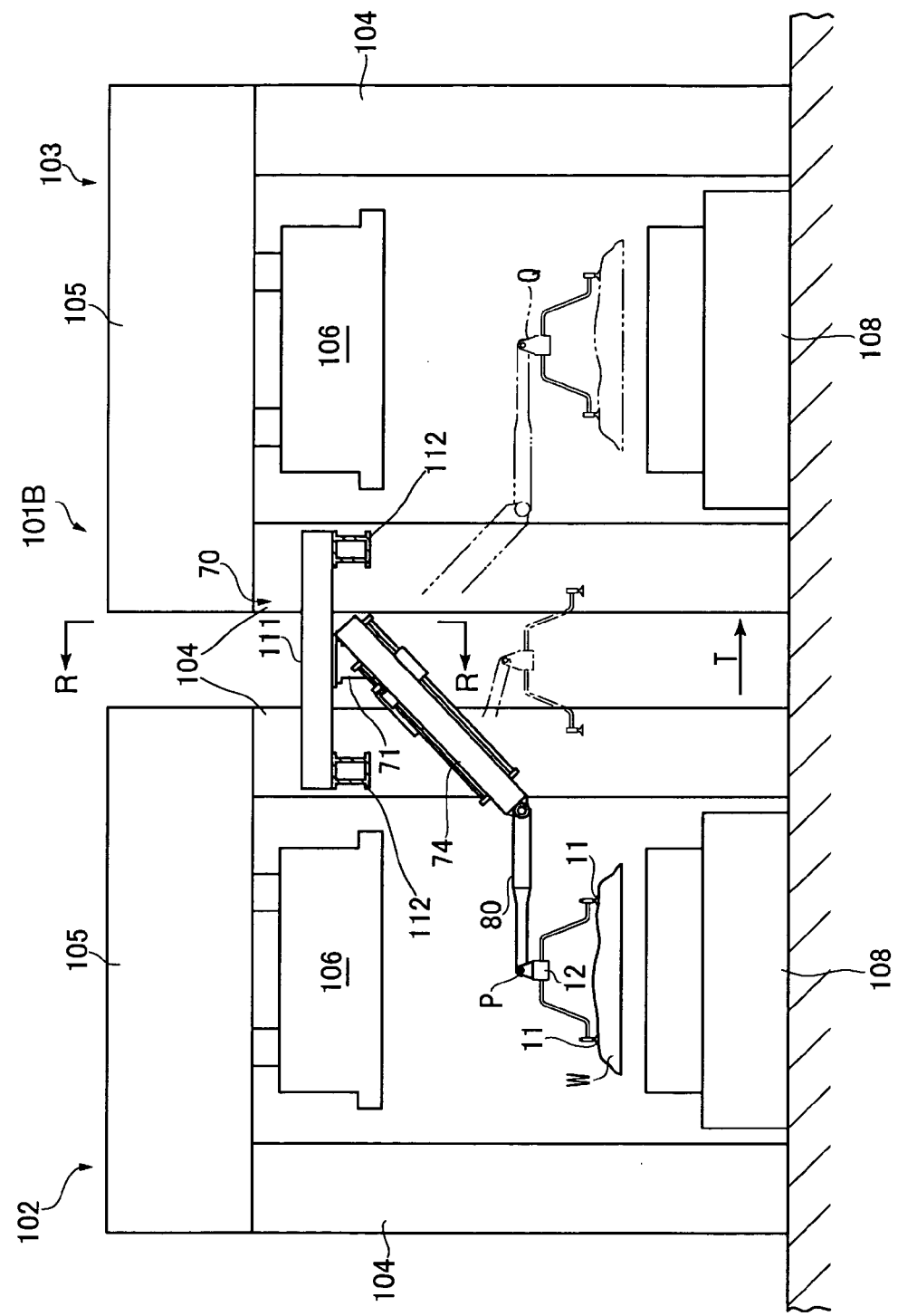
FIG. 20 is a general schematic explanatory view of a tandem press line according to a ninth embodiment of the invention.
Figure 21:
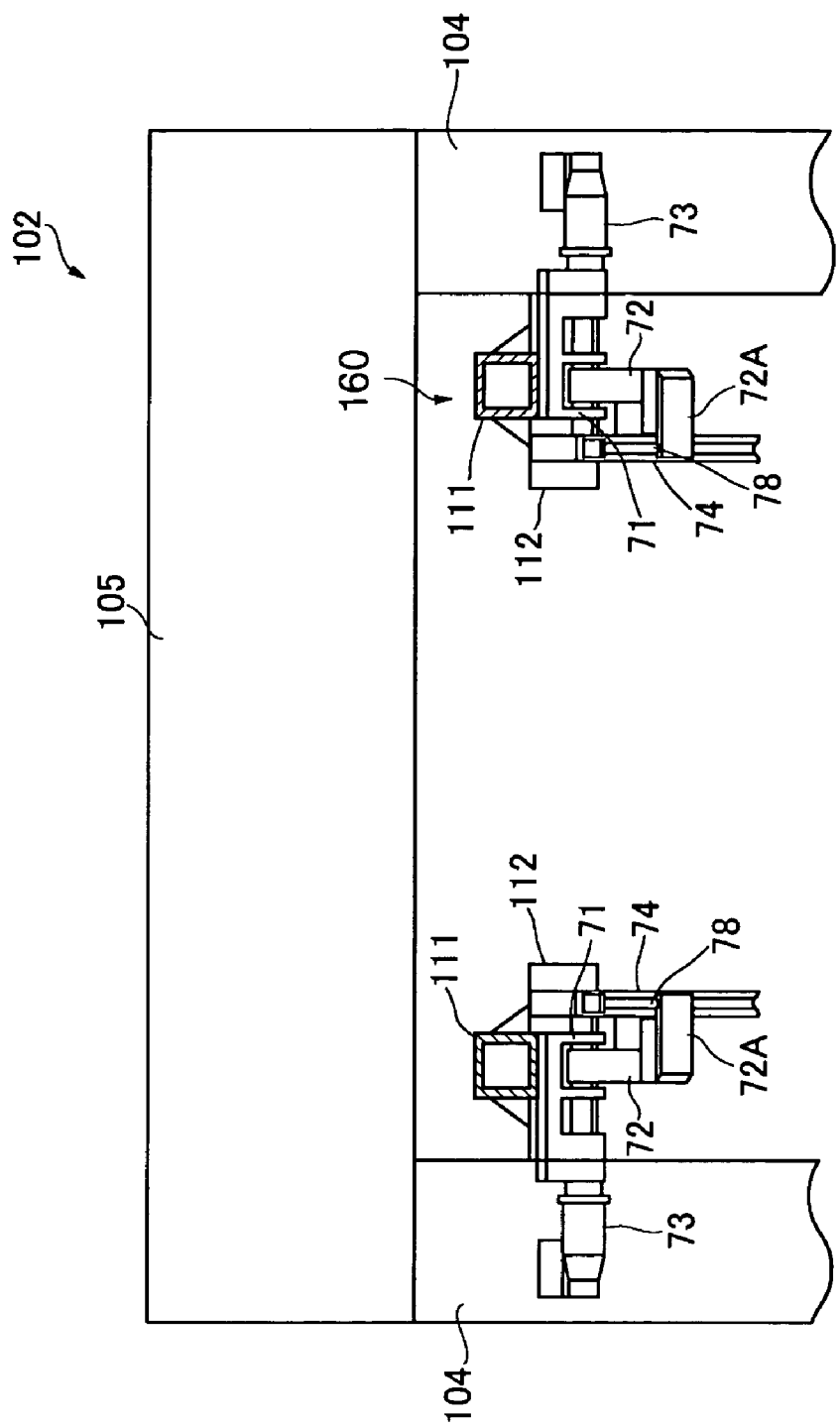
FIG. 21 is an essential part side view taken along line R—R of FIG. 20.

Next, a ninth embodiment of the invention will be described below. FIG. 20 shows a general schematic explanatory view of a tandem press line according to the ninth embodiment of the invention. FIG. 21 shows an essential part side view taken along line R—R of FIG. 20. The ninth embodiment is associated with a case where the workpiece conveyor 70 (See FIG. 8) of the fourth embodiment for a transfer press is applied as a workpiece conveyor 160 for use in a tandem press line 101B. Of course, it is also possible to use the workpiece conveyor 10, 30 or 50 of the first to third embodiments in place of the workpiece conveyor 70 of the fourth embodiment.

In the ninth embodiment, a pair of beams (supporting members) 111 are provided between the adjacent press machines 102, 103 of the tandem press line 101B. The pair of beams 111 are placed apart at right and left when viewed in the workpiece conveying direction T and located above the die carry-in-and-out passage. One end of each beam 111 is secured to the downstream upright 104 of the upstream press machine 102 through the supporting bracket 112, whereas the other end being likewise secured to the upstream upright 104 of the downstream press machine 103 through the supporting bracket 112. In the workpiece conveyor 160, the bracket 71 is secured to the center of each beam 111, and the rocking table 72 is rockingly supported by each beam 111. In FIGS. 20, 21, the parts similar to or corresponding to those of the eighth embodiment are designated by the same reference numerals as given to the eighth embodiment and a detailed description thereof is omitted.

According to the ninth embodiment, not only can the effect described in the fourth embodiment be achieved by the tandem press line 101B, but also the peripherals of the cross bar 12 of the workpiece conveyor 160 can be retracted, for die replacement, from the die carry-in-and-out passage. This retracting operation can be quickly carried out by manipulating the workpiece conveyor 160 with the result that the time required for die replacement can be reduced and improved productive efficiency can be achieved, compared to the prior art. In addition, since the workpiece conveyor 160 is supported so as to be suspended from the pair of beams 111 held between the adjacent press machines 102, 103, the floor space between the press machines 102, 103 can be effectively utilized as a passageway, delivery path or the like.

Tenth Embodiment

Figure 22:
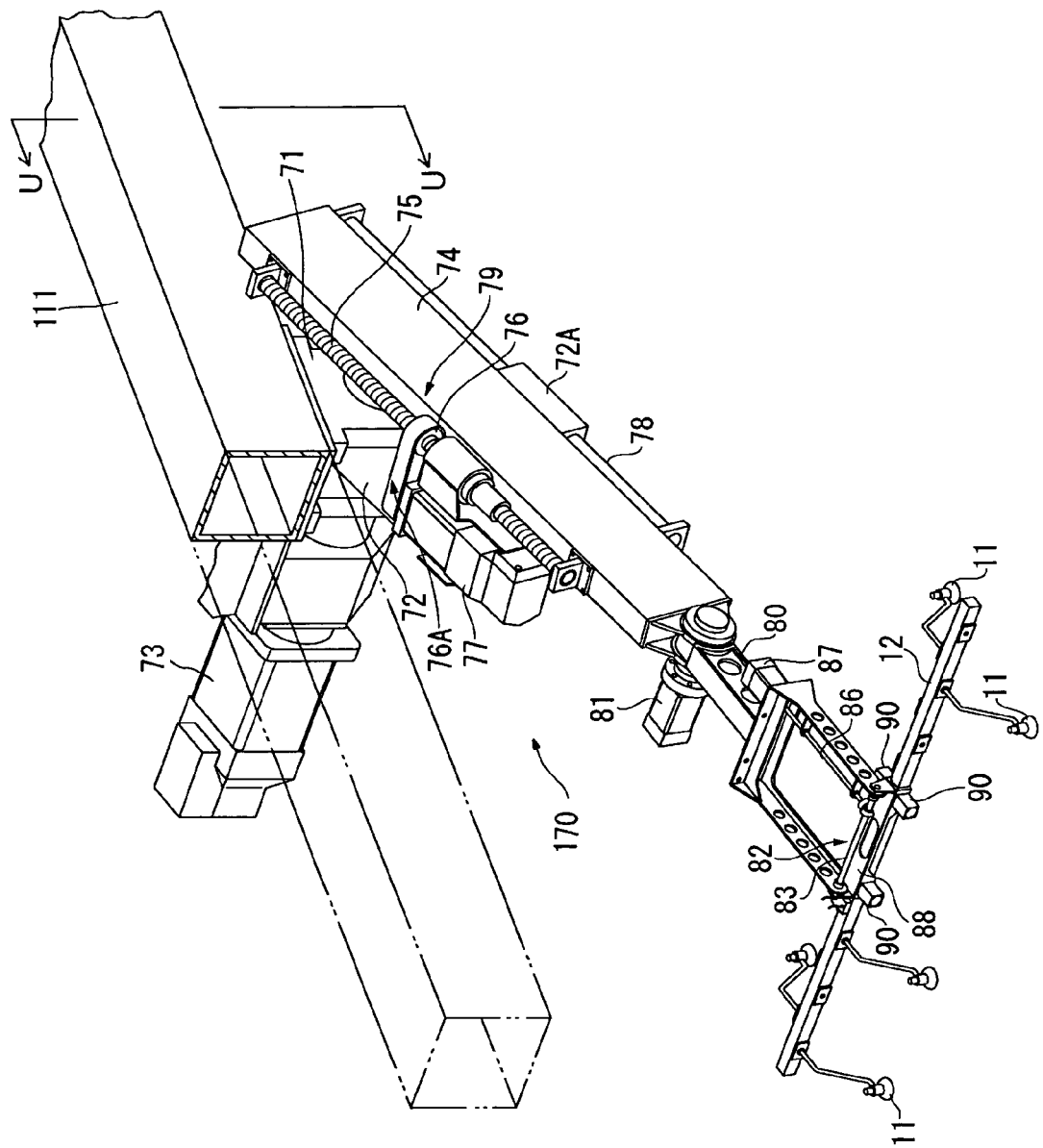
FIG. 22 is a perspective view of a workpiece conveyor according to a tenth embodiment of the invention.
Figure 23:
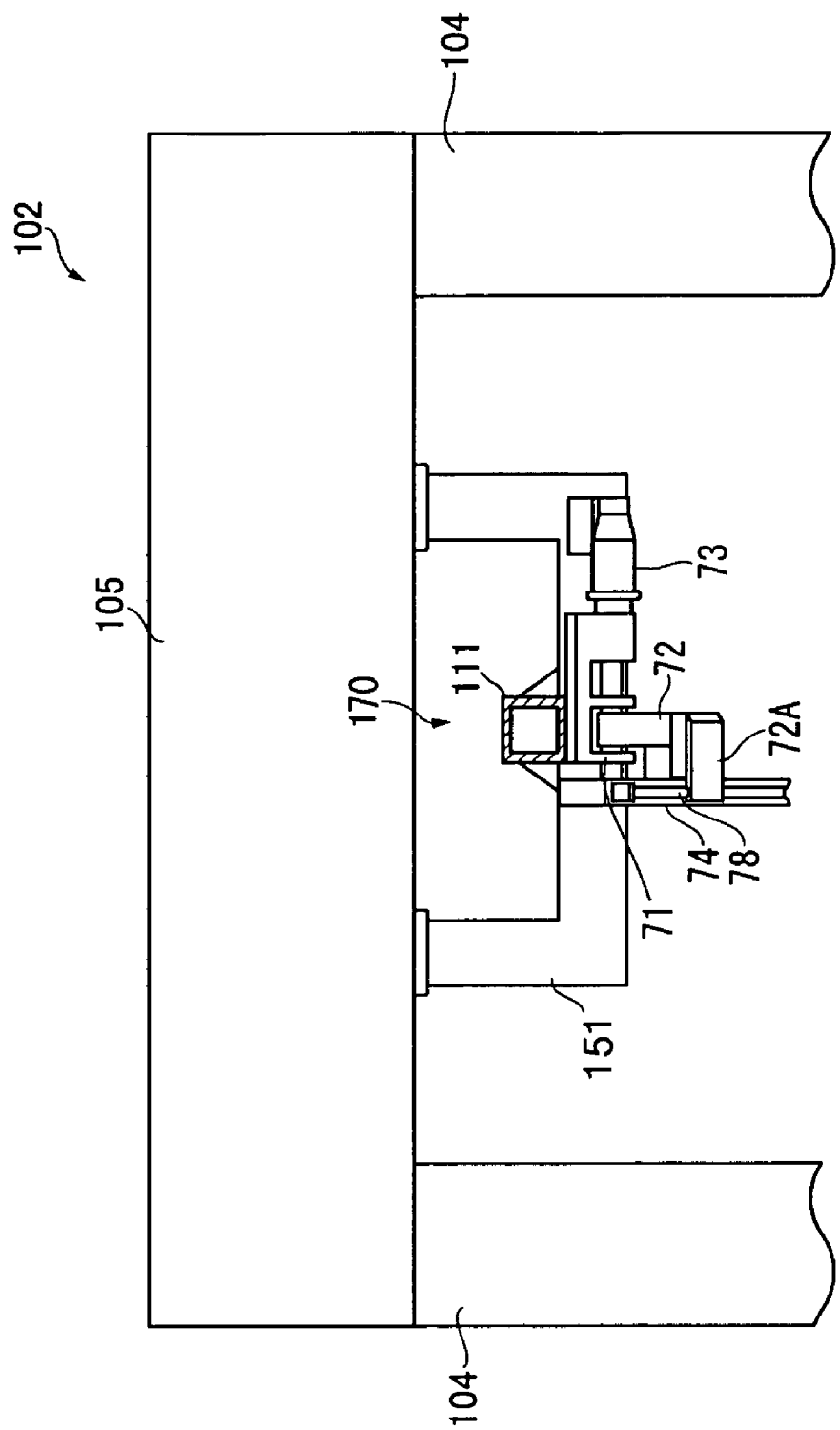
FIG. 23 is an essential part side view taken along line U—U of FIG. 22.
Figure 24:
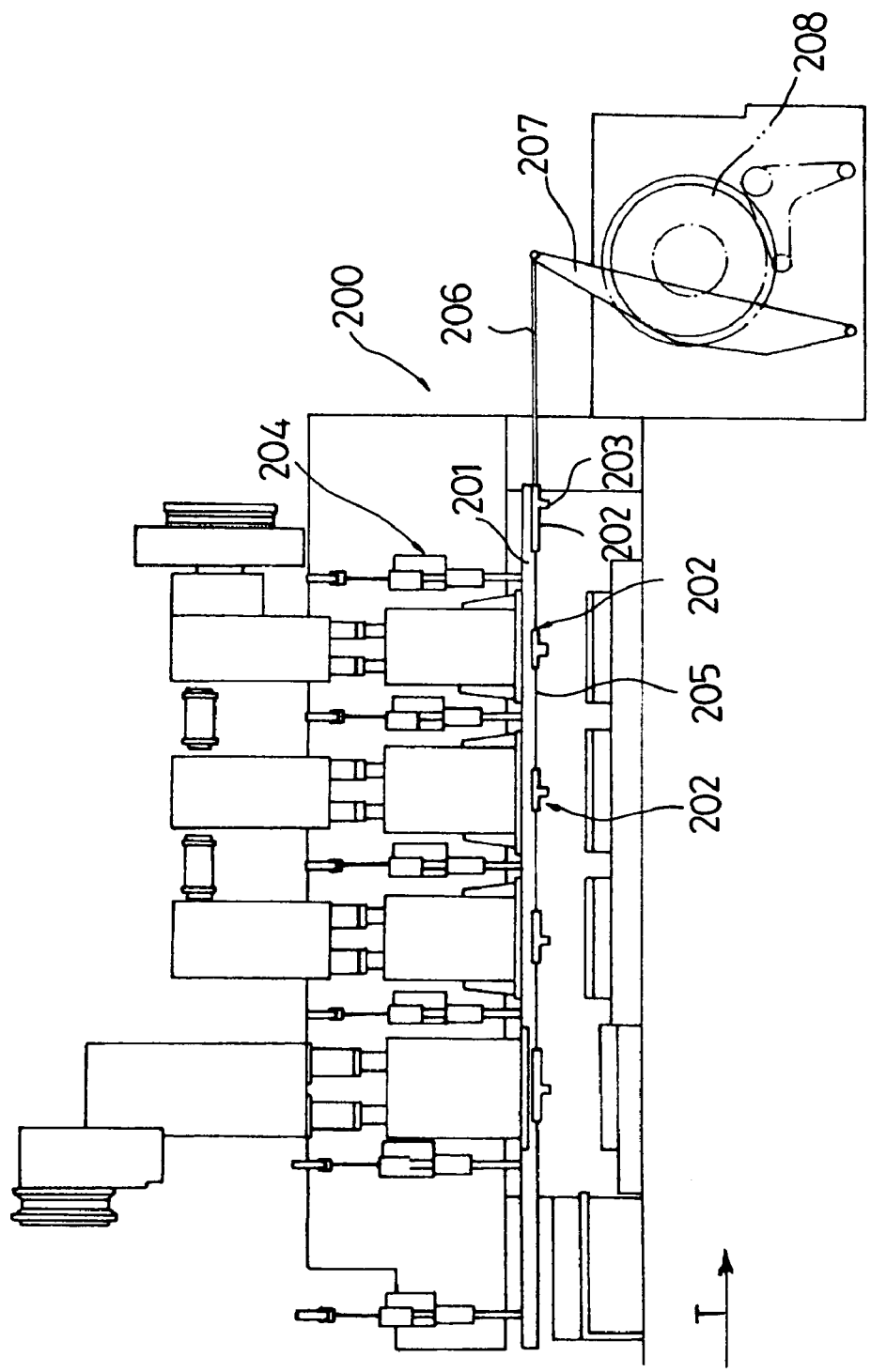
FIG. 24 is a structural explanatory view (1) of a prior art workpiece conveyor.
Figure 25:
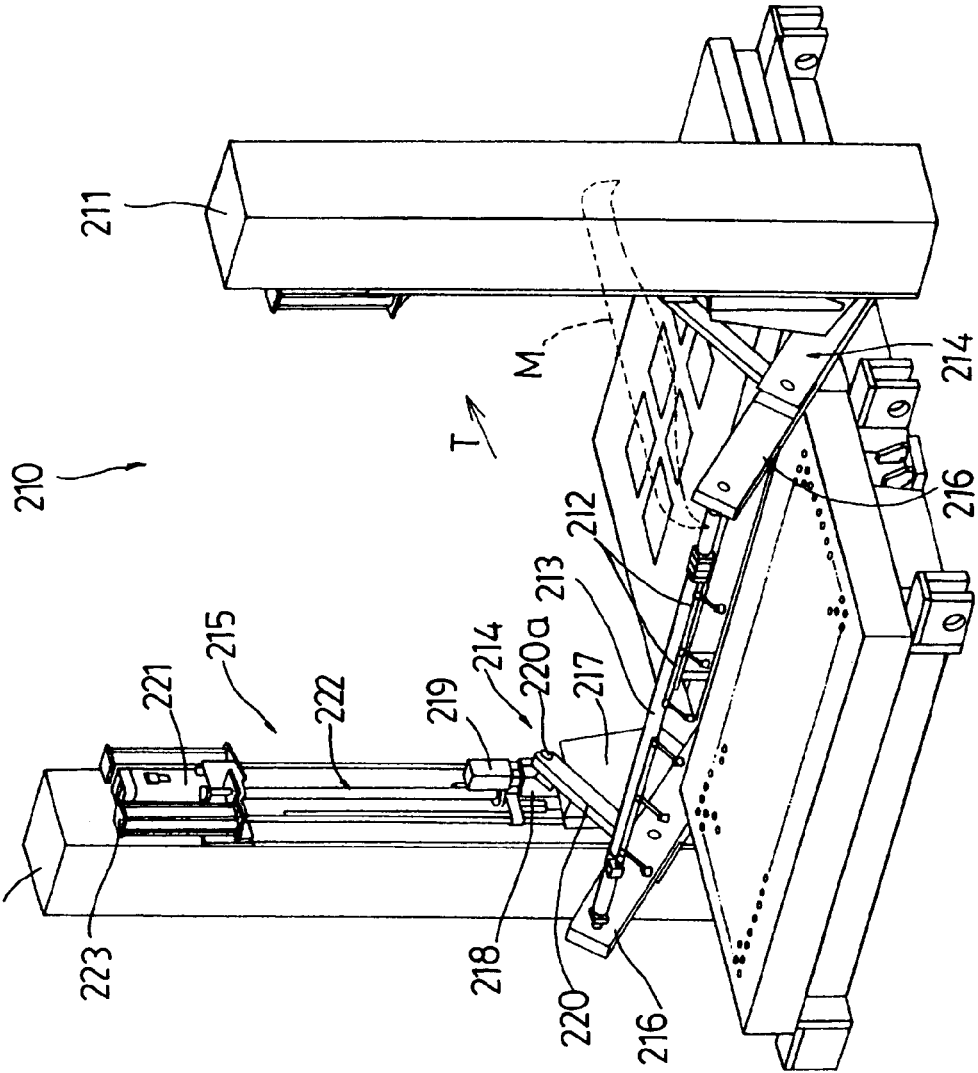
FIG. 25 is a structural explanatory view (2) of another prior art workpiece conveyor.
Figure 26:
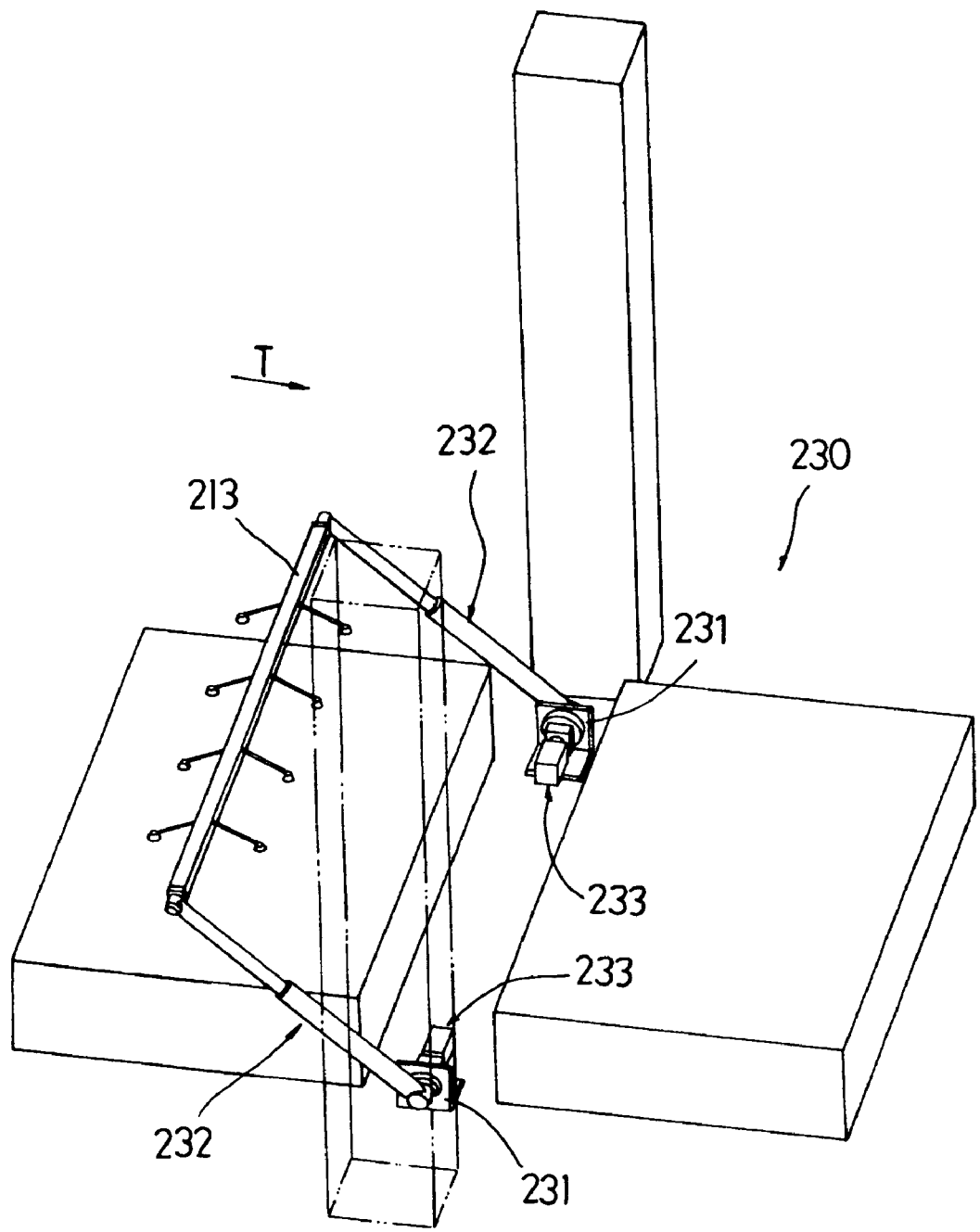
FIG. 26 is a structural explanatory view (3) of another prior art workpiece conveyor.

FIG. 22 shows a perspective view of a workpiece conveyor according to a tenth embodiment of the invention. FIG. 23 shows an essential part side view taken along line U—U of FIG. 22. In FIGS. 22, 23, the parts similar to or corresponding to those of the ninth embodiment are designated by the same reference numerals as given to the ninth embodiment and a detailed description thereof is omitted.

The tenth embodiment is associated with a case where the workpiece conveyor 160 of the ninth embodiment for use in the tandem press line 101B is further downsized. In the ninth embodiment, the workpiece conveyor 70 of the fourth embodiment is applied as a workpiece conveyor for the tandem press line 101B. As described earlier, the workpiece conveyor 70 of the fourth embodiment (See FIG. 8) is such that two driving systems each extending from a rocking table 72 down to the cross bar 12 are employed and synchronized with each other to function as one workpiece conveyor. Although the workpiece conveyor for use in a tandem press line according to the tenth embodiment has the same basic structure as the workpiece conveyor 70 of the fourth embodiment, the tenth embodiment differs from the fourth embodiment in that one driving system extending from the rocking element (rocking table 72) down to the cross bar 12 is employed to constitute one workpiece conveyor 170 as shown in FIG. 22. It is also possible for the tenth embodiment to employ the same basic structures as those of the workpiece conveyors 10, 30, 50 of the first to third embodiments instead of the workpiece conveyor according to the tenth embodiment of the invention and to use one system as the driving system from the rocking element (the feed lever 14, the rocking table 34 or the first arm 52) to the cross bar 12 to constitute one workpiece conveyor 170.

While the number of beams 111 held between the adjacent press machines 102, 103 is two in the fifth embodiment, it is one in the tenth embodiment. In the tenth embodiment, each end of the beam 111 is secured to a U-shaped support frame 151 attached to the undersides of the upper frames 105. Herein, the support frame 151 of each press machine 102 (103) is located at the substantial center of the space between the uprights 104 aligned in the die carry-in-and-out direction. In the workpiece conveyor 170 of the tenth embodiment, the bracket 71 for supporting the rocking table 72 is disposed intermediate between the adjacent press machines 102, 103, being secured to the underside of the center of the beam 111.

According to the tenth embodiment, there is only one beam 111 held between the adjacent press machines 102, 103 like the eighth embodiment (See FIG. 18), so that the structure of the workpiece conveyor can be more simplified and, in consequence, further cost reduction can be achieved compared to the fifth embodiment having a pair of beams 111. Additionally, no workpiece conveyor 170 is installed on the side of the inner side faces of the uprights 104 and therefore there is no need to widen the spacing between the uprights 104, which leads to downsizing of the main body parts of the press machines 102, 103 and further cost reduction. This further offers such a benefit that the workpiece conveyor 170 can be applied to reconstruction (retrofitting) of existing presses in which the spacing between the uprights 104 is unadjustable.

In each of the embodiments described above, a cantilevered finger type or cantilevered cup type workpiece supporting means may be employed in place of such a workpiece supporting means as the cross bar 12.

While the fifth to eighth embodiments have been described with a case where the carriers 113 are linearly moved by activation of the linear motors, the invention is not limited to this but may be modified such that the carriers 113 are linearly moved by a ball screw slider mechanism or rack pinion mechanism having a servo motor as a driving source.

What is claimed is:

1. A workpiece conveyor for a press line, comprising:
   a rocking element which is drivable to oscillate in a workpiece conveying direction;
   a cross bar for supporting a workpiece via a workpiece holding mechanism for detachably holding the workpiece;
   a cross bar supporting member which supports the cross bar and is movably coupled to the rocking element via a linear movement mechanism, such that a vertical distance between a center of oscillation of the rocking element and the cross bar is variable.

2. The workpiece conveyor for a press line according to claim 1, wherein said cross bar is attached to the rocking element via at least one link.

3. The workpiece conveyor for a press line according to claim 1, wherein said press line is a transfer press and said rocking element is supported by and suspended from a supporting column structural member via a support shaft, said supporting column structural member vertically hanging from a crown of the transfer press.

4. The workpiece conveyor for a press line according to claim 1, wherein said press line is a tandem press line in which a plurality of independent press machines are arranged in a line, and said rocking element is supported by and suspended from a beam via a support shaft, the beam being held between adjacent press machines.

5. The workpiece conveyor for a press line according to claim 4, wherein one said beam is held between said press machines.

6. The workpiece conveyor for a press line according to claim 2, further comprising a feed lever, which supports the cross bar supporting member;
   wherein the at least one link is pivotably coupled to the feed lever and is driven to pivot by a driving unit provided at a proximal end thereof.

7. The workpiece conveyor for a press line according to claim 2, wherein the at least one link comprises a tilting mechansim for tilting the workpiece in upward and downward directions by driving the cross bar so as to rotate about a long axis thereof;
   wherein the tilting mechanism comprises:
      a driving unit mounted on the at least one link;
      a drive shaft driven by the driving unit; and
      a driven shaft driven to rotate by the drive shaft; and
   wherein the cross bar supporting member comprises a bracket that rotates together with the driven shaft.

8. The workpiece conveyor for a press line according to claim 1, further comprising tilting means for tilting the workpiece in upward and downward directions by driving the cross bar so as to rotate about a long axis thereof.

9. The workpiece conveyor for a press line according to claim 8, wherein the tilting means comprise a driving unit mounted on the cross bar supporting member.

10. The workpiece conveyor for a press line according to claim 1, wherein the cross bar supporting member is movable along the rocking element.

11. The workpiece conveyor for a press line according to claim 10, wherein the rocking element comprises a feed lever, and the feed lever houses at least a part of the linear movement mechanism.

12. The workpiece conveyor for a press line according to claim 1, further comprising a feed lever, which supports the cross bar supporting member and which supports the linear movement mechanism.

13. The workpiece conveyor for a press line according to claim 12, wherein the rocking element comprises a rocking table, and the linear movement mechanism is drivable to move the feed lever with respect to the rocking table.

14. The workpiece conveyor for a press line according to claim 13, wherein the feed lever houses at least a part of the linear movement mechanism.

15. The workpiece conveyor for a press line according to claim 13, wherein at least a part of the linear movement mechanism is mounted on the feed lever.

16. The workpiece conveyor for a press line according to claim 1, wherein the linear movement mechanism comprises a ball screw.

17. A workpiece conveyor for a press line, comprising:
   a rocking element which is drivable to oscillate in a workpiece conveying direction;
   a cross bar for supporting a workpiece via a workpiece holding mechanism for detachably holding the workpiece;
   a cross bar supporting member which supports the cross bar and is movably coupled to the rocking element via a linear movement mechanism, such that a distance between a center of oscillation of the rocking element and the cross bar is variable;
   wherein said press line is a tandem press line in which a plurality of independent press machines are arranged in a line, and said rocking element is mounted on a carrier via a support shaft, said carrier being movable along a beam held between adjacent press machines.

18. The workpiece conveyor for a press line according to claim 17, wherein one said beam is held between said press machines.

19. A workpiece conveyor for a press line, comprising:
   a rocking element which is drivable to oscillate in a workpiece conveying direction;
   a cross bar for supporting a workpiece via a workpiece holding mechanism for detachably holding the workpiece; and
   at least one link which couples the cross bar to the rocking element, such that a vertical distance between a center of oscillation of the rocking element and the cross bar is variable.

20. The workpiece conveyor for a press line according to claim 19, wherein said press line is a transfer press and said rocking element is supported by and suspended from a supporting column structural member via a support shaft, said supporting column structural member vertically hanging from a crown of the transfer press.

21. The workpiece conveyor for a press line according to claim 19, wherein said press line is a tandem press line in which a plurality of independent press machines are arranged in a line, and said rocking element is supported by and suspended from a beam via a support shaft, the beam being held between adjacent press machines.

22. The workpiece conveyor for a press line according to claim 21, wherein one said beam is held between said press machines.

23. The workpiece conveyor for a press line according to claim 19, wherein said press line is a tandem press line in which a plurality of independent press machines are arranged in a line, and said rocking element is mounted on a carrier via a support shaft, said carrier being movable along a beam held between adjacent press machines.

24. The workpiece conveyor for a press line according to claim 23, wherein one said beam is held between said press machines.

25. The workpiece conveyor for a press line according to claim 19, further comprising tilting means for tilting the workpiece in upward and downward directions by driving the cross bar so as to rotate about a long axis thereof.

26. The workpiece conveyor for a press line according to claim 25, wherein the tilting means comprise a driving unit provided at a distal end of the at least one link.

27. The workpiece conveyor for a press line according to claim 19, wherein the at least one link is pivotably coupled to the rocking element, and is driven to pivot by a driving unit provided at a distal end of the rocking element.

* * * * *